(12) United States Patent
Jelveh

(10) Patent No.: US 11,042,784 B2
(45) Date of Patent: Jun. 22, 2021

(54) MACHINE LEARNING SYSTEM AND METHOD FOR DETERMINING OR INFERRING USER ACTION AND INTENT BASED ON SCREEN IMAGE ANALYSIS

(71) Applicant: M37 Inc., San Francisco, CA (US)

(72) Inventor: Ali Jelveh, San Francisco, CA (US)

(73) Assignee: M37 INC., San Francisco, CA (US)

( * ) Notice: Subject to any disclaimer, the term of this patent is extended or adjusted under 35 U.S.C. 154(b) by 57 days.

(21) Appl. No.: 16/107,639

(22) Filed: Aug. 21, 2018

(65) Prior Publication Data

US 2019/0087691 A1   Mar. 21, 2019

Related U.S. Application Data

(60) Provisional application No. 62/559,180, filed on Sep. 15, 2017, provisional application No. 62/641,486, filed on Mar. 12, 2018.

(51) Int. Cl.
*G06K 9/62* (2006.01)
*G06N 3/08* (2006.01)
(Continued)

(52) U.S. Cl.
CPC ......... *G06K 9/6263* (2013.01); *G06K 9/6254* (2013.01); *G06N 3/084* (2013.01);
(Continued)

(58) Field of Classification Search
CPC ............... G06K 9/6263; G06K 9/6254; G06K 2209/03; G06N 20/00; G06N 3/084; G06N 7/005; G06N 3/006; G06T 13/40
See application file for complete search history.

(56) References Cited

U.S. PATENT DOCUMENTS

| 8,706,754 | B2* | 4/2014 | Channing | G06F 16/901 |
| | | | | 707/769 |
| 2009/0119234 | A1* | 5/2009 | Pinckney | G06N 20/00 |
| | | | | 706/12 |

(Continued)

*Primary Examiner* — Christopher M Brandt
(74) *Attorney, Agent, or Firm* — Amin, Turocy & Watson, LLP

(57) ABSTRACT

System(s) and method(s) that analyze image data associated with a computing screen operated by a user, and learns the image data (e.g., using pattern recognition, historical information analysis, user implicit and explicit training data, optical character recognition (OCR), video information, 360°/panoramic recordings, and so on) to concurrently glean information regarding multiple states of user interaction (e.g., analyzing data associated with multiple applications open on a desktop, mobile phone or tablet). A machine learning model is trained on analysis of graphical image data associated with screen display to determine or infer user intent. An input component receives image data regarding a screen display associated with user interaction with a computing device. An analysis component employs the model to determine or infer user intent based on the image data analysis; and an action component provisions services to the user as a function of the determined or inferred user intent. In an implementation, a gaming component gamifies interaction with the user in connection with explicitly training the model.

20 Claims, 19 Drawing Sheets

(51) Int. Cl.
  *G06N 20/00*  (2019.01)
  *G06T 13/40*  (2011.01)
  *G06N 3/00*  (2006.01)
  *G06N 7/00*  (2006.01)

(52) U.S. Cl.
  CPC ......... *G06N 20/00* (2019.01); *G06K 2209/03* (2013.01); *G06N 3/006* (2013.01); *G06N 7/005* (2013.01); *G06T 13/40* (2013.01)

(56) References Cited

U.S. PATENT DOCUMENTS

| | | | |
|---|---|---|---|
| 2014/0096077 A1* | 4/2014 | Jacob | G06F 3/013 |
| | | | 715/810 |
| 2016/0041733 A1* | 2/2016 | Qian | G06F 19/321 |
| | | | 715/771 |
| 2017/0031711 A1* | 2/2017 | Wu | G06F 9/453 |
| 2017/0132019 A1* | 5/2017 | Karashchuk | G06F 40/166 |
| 2018/0131645 A1* | 5/2018 | Magliozzi | G06Q 10/107 |
| 2018/0165596 A1* | 6/2018 | Abrams | G06N 20/00 |
| 2018/0188938 A1* | 7/2018 | Deselaers | G06N 3/0454 |
| 2018/0336411 A1* | 11/2018 | Schuh | G06K 9/00664 |
| 2019/0252061 A1* | 8/2019 | Chang | G06F 16/54 |

\* cited by examiner

MACHINE LEARNING SYSTEM AND METHOD FOR DETERMINING OR INFERRING USER ACTION AND INTENT BASED ON SCREEN IMAGE ANALYSIS

CROSS REFERENCE TO RELATED APPLICATIONS

This patent application claims the benefit of U.S. Provisional Application Ser. No. 62/559,180, filed on Sep. 15, 2017, the entirety of which is incorporated herein by reference. This patent application also claims the benefit of U.S. Provisional Application Ser. No. 62/641,486, filed on Mar. 12, 2018, the entirety of which is incorporated herein by reference.

TECHNICAL FIELD

The subject disclosure relates to machine learning system(s) and/or method(s) for determining or inferring user action and/or user intent based on screen image analysis.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products are described.

The innovations described herein relate to a system to facilitate determining or inferring user intent and/or user action. Conventional user behavior monitoring and tracking systems are in general limited to analyzing data within a particular application programming interface (API) or web interaction (e.g., a Face Book instance, a web browsing instance, an application instance, and so on). Such systems thus analyze data within a specific instance and context, and so determinations or inferences regarding user behavior or intent are often limited to the particular data vertical analysis. However, users are often multitasking within a computing environment, and consequently conventional systems are inadequate for learning the larger corpus of information pertaining to a user. For instance, if a user operates a first program (e.g., a word processor) and a second program (e.g., a webpage) simultaneously on a computing device, conventional user behavior tracking systems can monitor the user's actions in only one of the first program or the second program, but not in both. Multiple conventional monitoring systems would have to be implemented to monitor the user's interactions in multiple programs (e.g., a specialized monitoring system dedicated to monitoring the user's actions in each distinct program, and so on). But even then, the recorded actions would not be correlated or otherwise multiplexed into a single timeline/data structure, thereby still failing to holistically track the user's overall computing behavior. One or more embodiments of the subject innovation can address these problems. Specifically, in various embodiments, the subject innovation can analyze image data associated with a computing screen operated by a user, and can learn the image data (e.g., using pattern recognition, historical information analysis, user implicit and explicit training data, optical character recognition (OCR), video information, 360°/panoramic recordings, and so on) and can concurrently glean information regarding multiple states of user interaction (e.g., analyzing data associated with multiple applications open on a desktop, mobile phone, tablet, television, vehicle display/interface, and so on).

Conventional methods of capturing screen interaction do not allow for multi-day or unlimited continuous recording (e.g., that could record years of computing interaction). Instead, conventional methods of capturing screens either work on a limited time basis (e.g., using screen-recording applications used for that process) or capturing screens on a periodic basis (e.g., every 3 seconds). In one or more embodiments, a system can allow for such capturing across any number of devices and/or screens. A specially designed capture and compression system can facilitate such types of recording and/or capturing of full interaction data continuously with minimal CPU usage.

More particularly, a machine learning model can be trained on analysis of graphical image data associated with screen display to determine or infer user intent and/or action. An input component can receive image data regarding a screen display associated with user interaction with a computing device. An analysis component can employ the model to determine or infer user intent based on the image data analysis; and an action component can provision services to the user as a function of the determined or inferred user intent. In an implementation, a gaming component can gamify interaction with the user in connection with explicitly training the model. A reward component can be employed to expose functionality associated with the trained model as a function of user training efforts.

In an aspect, an interactive component can share status of training of the model with other entities. For example, friends can expose status of a gaming component which exposes level of training achieved and functionalities available. In yet another aspect, an avatar component can generate an avatar that interacts with the user based in part on the model and the action component. A training component can generate an interface for explicitly training the model by the user. The training component can question the user regarding accuracy of determinations or inferences generated by the model.

The model can employ a recursive learning algorithm or backward propagation of learning across other models or continuous learning algorithm. The model can learn impact of respective images and direct the action component to revise actions as a function of the learned impact. An optimization component can generate inferences, based on the model, regarding potential points of failure, weakness or bottlenecks in connection with taking automated action. A scheduling component can be utilized to schedule activities for the user. The model can identify two or more applications running concurrently on the screen, and can determine or infer user intent regarding the respective applications.

In some embodiments, elements described in connection with the computer-implemented method(s) can be embodied in different forms such as a system, a computer program product, or another form.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The innovations described herein relate to a system to facilitate determining or inferring user intent and/or user action. Conventional user behavior monitoring and tracking systems are in general limited to analyzing data within a particular application programming interface (API) or web interaction (e.g., a Face Book instance, a web browsing instance, an application instance, and so on). Such systems thus analyze data within a specific instance and context, and so determinations or inferences regarding user behavior or intent are often limited to the particular data vertical analysis. However, users are often multitasking within a computing environment, and consequently conventional systems are inadequate for learning the larger corpus of information pertaining to a user. The subject innovation can analyze image data associated with a computing screen operated by a user, and can learn the image data (e.g., using pattern recognition, historical information analysis, user implicit and explicit training data, optical character recognition (OCR), video information, 360°/panoramic recordings, and so on) and can concurrently glean information regarding multiple states of user interaction (e.g., analyzing data associated with multiple applications open on a desktop, mobile phone or tablet). The model can analyze multiple sets of screen image data in a time series manner For example, if a user is simultaneously using a word processing program, an email account, and another internet webpage (e.g., such that part of the word processing program, part of the email account, and part of the internet webpage are displayed concurrently on the screen), the subject innovation can analyze the entire screen data over a period of time so as to monitor and/or track user behavior and/or interaction in all three instances (e.g., what document was open and/or what words/sentences were typed in the word processor, what emails were sent/received/read and/or to/from whom in the email account, and what browser was used and/or what links were selected in the internet webpage, and so on), thereby constituting a significant improvement over conventional systems.

Figure 1:
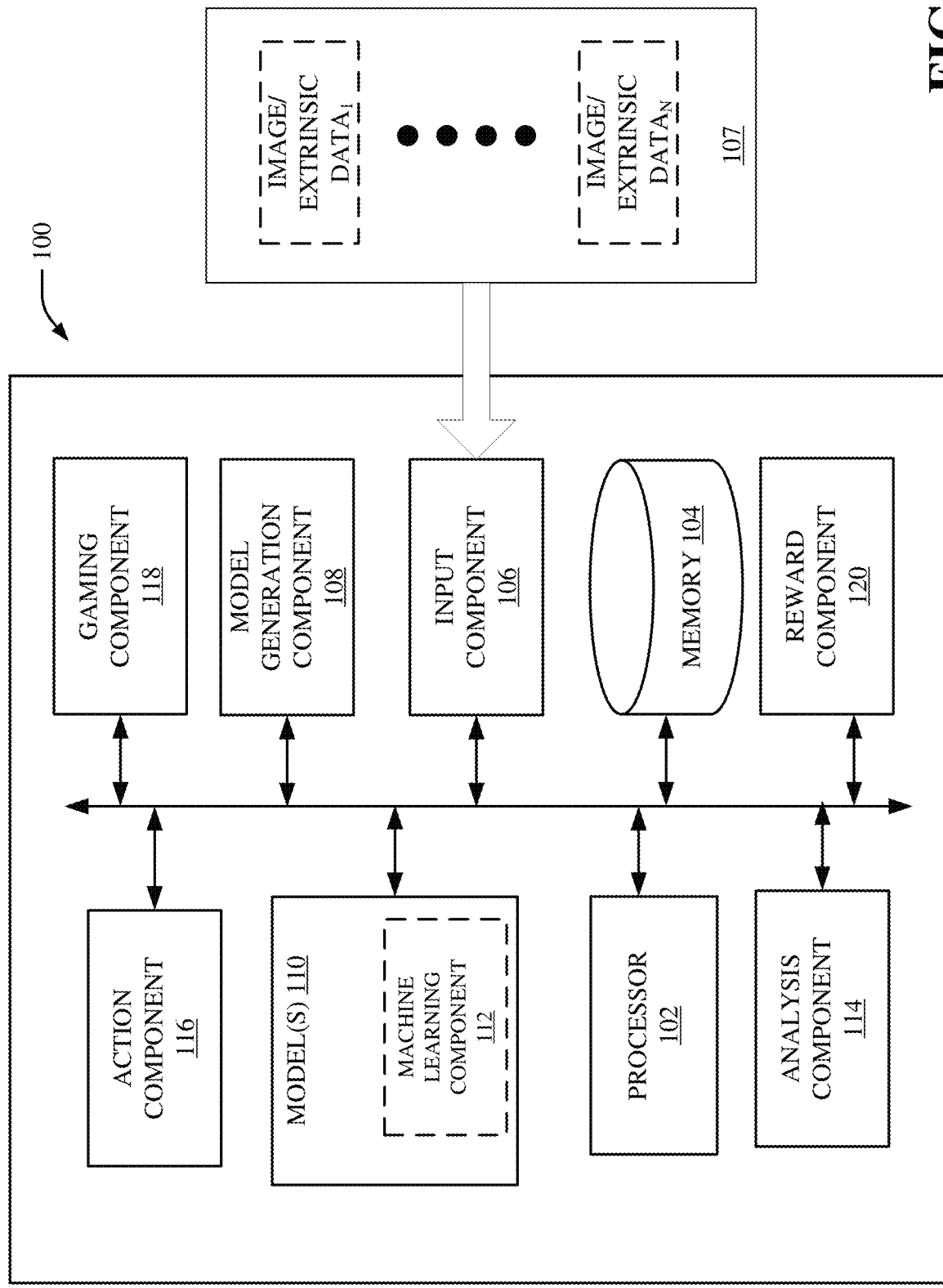
FIG. 1 illustrates a system in accordance with one or more embodiments described herein.

FIG. 1 illustrates system 100 that facilitates learning, determining and predicting user intent. A processor 102 can execute computer executable components stored in a memory 104. An input component 106 can receive image data 107 regarding a screen display associated with user interaction with a computing device. For example, the input component can capture images of the computing screen or a subset thereof. Additionally, the input component 106 can also capture any type of extrinsic information (e.g., audio, motion, location, weather, temperature, and so on) to facilitate determining or inferring user state and associated context. In various embodiments, the input component 106 can include (and/or be communicatively connected to) an electroencephalograph (EEG device) (e.g., a wired and/or wireless headset with EEG sensors coupled thereto, and so on) to receive and/or record brainwave data from the user. Moreover, any other bio-sensors can be incorporated to record/measure other physical measurements and/or bio-data (e.g., heartbeat, body surface tension, body temperature, body movements, micromovements and/or twitches, eye tracking, and so on). In such cases, one or more brainwaves of the user (and/or any other bio-data of the user) can be monitored so as to detect emotions, thoughts, and/or intentions while the user interacts with the computing device (s). Such measured bio-data can be correlated in time with on-screen interactions and/or on-screen objects. A model generation component 108 can generate a model 110 that can be trained on data from the input component 106 as well as user provided data (e.g., implicit or explicit training data), and through a machine learning component 112 the model 110 can converge on determining, predicting or inferring user intent with high confidence. After a particular confidence level is achieved, the model can facilitate the system taking automated action (e.g., using a utility-based analysis where the benefit of taking an automated action correctly is weighed against the cost of taking an incorrect action). An analysis component 114 can employ the model 110 to determine or infer user intent based on the image data analysis; and an action component 116 can provision services to the user as a function of the determined or inferred user intent. In an implementation, a gaming component 118 can gamify interaction with the user in connection with explicitly training the model 110. A reward component 120 can be employed to expose functionality associated with the trained model 110 as a function of user training efforts.

In various embodiments, the system (e.g., via the machine learning component 112 and/or the analysis component 114) can analyze the images, screenshots, and/or extrinsic data 107 by employing focus objects and/or focus sections. Focus objects/sections can represent visual portions (e.g., groups of pixels) of a particular on-screen display that have more importance/relevance than other portions of the on-screen display. In some cases, the focus objects/sections can represent changing/transient visual portions of the screen; in other cases, they can represent non-transient visual portions of the screen. Thus, focus objects/sections can enable the system to distinguish between important and unimportant changes in the on-screen display (e.g., changes from one stored image to another among a sequence of stored images, screenshots, and extrinsic data 107, and so on). For example, a digital clock icon is generally displayed in a corner of a computer display screen. Although the displayed time changes every minute (e.g., the pixels in that portion of the screen change to show the new time), such on-screen changes are usually not very important/relevant regarding the interactions/tasks performed by the user on the computing device (e.g., the time constantly changes, but such changes often convey no substantive information regarding what the user was doing on the computing device when those screens were displayed). In contrast, changes made to the body of a word document, a change in the recipient field and/or carbon copy field of an email, and/or a change in website URLs can be very important/relevant regarding the substantive actions that the user was performing. Thus, in some instances, the portion of the screen that displays the clock can be marked as not a focus object/section. Conversely, the portions of the screen displaying email recipient fields, email subject fields, bodies of word processing documents, internet browser fields, and so on can be marked as focus objects/sections (e.g., indicating that such portions are substantively important). Focus objects/sections as described can be implemented via dirty rectangle algorithms known in the art, in conjunction with OCR and other image analysis. In some embodiments, continuous, periodic, and/or regular on-screen changes (e.g., changing of clock icon every minute, and so on) can be recognized via image analysis and can accordingly be noted as not a focus object/section. In some embodiments, unique, nonperiodic, and/or irregular on-screen changes (e.g., writing/deleting words in a word document/email, and so on) can similarly be recognized via image analysis and can accordingly be noted as focus objects/sections. In still more embodiments, each focus object/section can have a respective time associated with it, which time represents the amount of time throughout a day (e.g., or any other time period) during which the focus object/section was displayed on the screen.

It is to be appreciated that not all components depicted in FIG. 1 are required for operation of the system 100, and that the system 100 can be implemented with a subset of the components illustrated.

Figure 2:
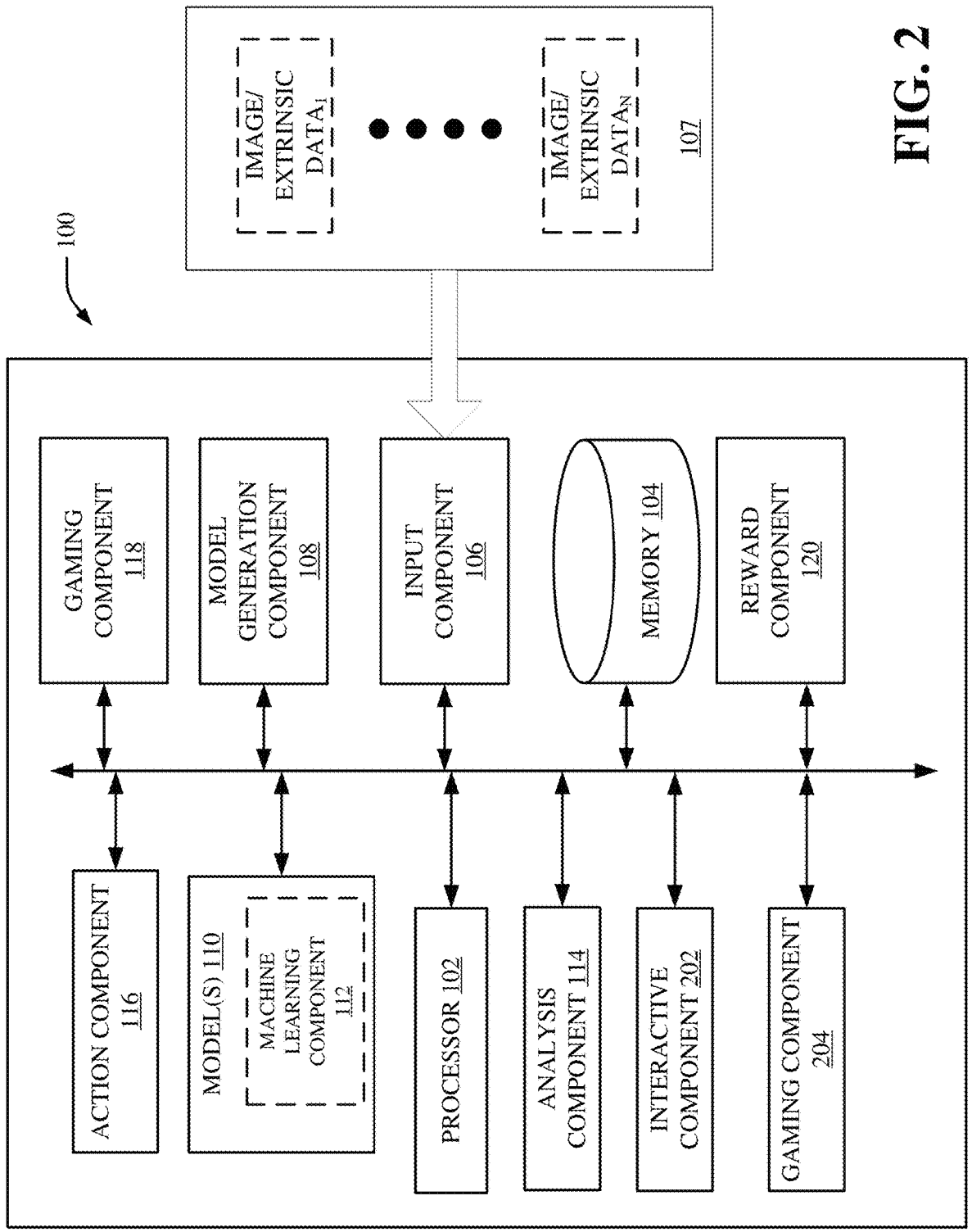
FIG. 2 illustrates a high-level diagram of an aspect of the innovations in accordance with one or more embodiments described herein.

FIG. 2 illustrates an implementation of the system 100 that includes an interactive component 202 that can share status of training of the model 110 with other entities. For example, friends can expose status of a gaming component 204 which exposes level of training achieved and functionalities available. It is to be appreciated that the user of embodiments herein can include entities, groups, machines, components, humans, and so on. The gaming component 204 can provide in a highly glanceable manner status of training of the model 110 and functionalities achieved thus far to the user and others. Accordingly, a competitive or incentivized environment can be created within a social network to encourage respective parties to continue training respective models, e.g., to stay ahead of others, achieve new functionalities, and create a model that provides for high-confidence automated action.

Figure 3:
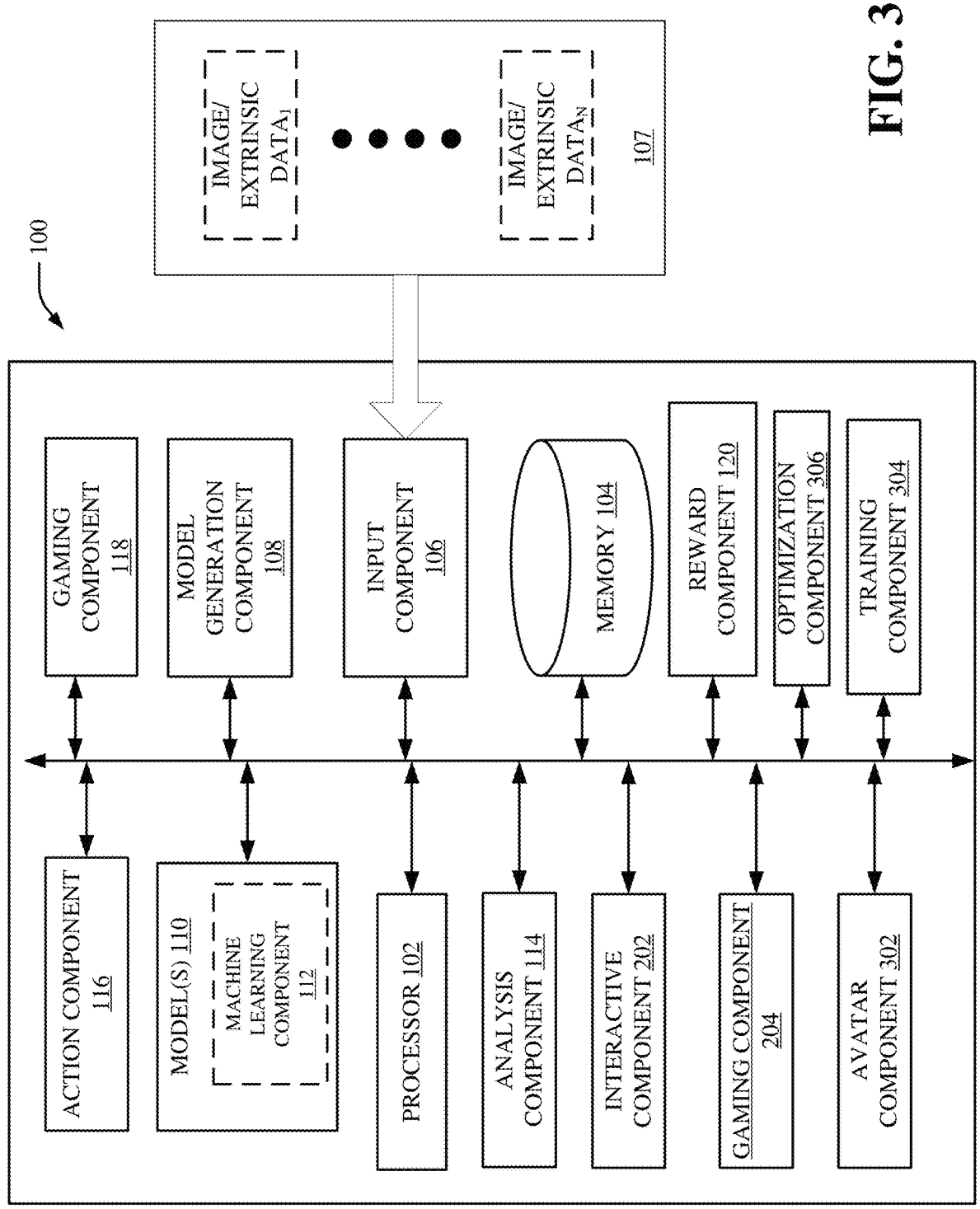
FIG. 3 illustrates a high-level diagram of an aspect of the innovations in accordance with one or more embodiments described herein.

In yet another aspect, illustrated in FIG. 3, an avatar component 302 can generate an avatar that interacts with the user based in part on the model 110 and the action component 116. A training component 304 can generate an interface for explicitly training the model 110 by the user. The training component 304 can question the user regarding accuracy of determinations or inferences generated by the model. In various embodiments, the training component 304 can give the user actions to perform and/or fulfill, in order to facilitate training on a known set. By purposely and controllably giving the user tasks to perform, the system can facilitate known/explicit training of itself. For example, the system can present a notification to a user that it is Mother's Day and that the user should send a message to the user's mother. The system can then record (e.g., via the input component 106 and the images/data 107) how the user performs such assigned tasks. Such recorded performances/actions can then be examined and/or analyzed by the system (e.g., via the machine learning component 112 and/or the analysis component 114) so as to learn how to perform such tasks (e.g., sending a message to the user's mother and/or to others) in the future. In various embodiments, this type of purposeful and controlled training of the system can be performed in addition to the observational/passive training of the system discussed above (e.g., applying image analysis and/or OCR to the received/recorded images, screenshots, and/or extrinsic data 107 without prompting the user to perform certain tasks). An optimization component 306 can optimize automated action taken by the action component 116. As described further below, the avatar 302 can serve as a personal assistant to the user and engage in dialog with the user in connection with training the model, confirming accuracy of predictions, taking automated action or seeking approval, and so on.

The model 110 can employ a recursive learning algorithm or backward propagation of learning across other models or continuous learning algorithm. The model 110 can learn impact and/or level of importance/relevance of respective images (e.g., via focus objects/sections) and direct the action component 116 to revise actions as a function of the learned impact. An optimization component 306 can generate inferences, based on the model, regarding potential points of failure, weakness or bottlenecks in connection with taking automated action.

The model generation component 108 can generate a set of models 110 of influencers. The machine learning component 112 can utilize data received by the input component 106 to score and rank influencers for insights on optimizing operations.

The model(s) 110 or machine learning component 112 can analyze influencer data with historical data utilizing physics-based, big data or data science to refine respective models. Big data can be for example operational, geographical, environmental, configuration and other data sets fused together. For example, atmospheric or airline workflow conditions that are measured at various frequencies for an airport can serve as valuable data with reference to data analysis in connection with building model(s).

The model(s) 110 or machine learning component 112 can employ artificial intelligence, physical domain expertise and other statistical methods to score and rank components and generate analytics regarding impact of respective influencers 107 on user action(s). The model(s) 110 or machine learning component 112 can perform recursive learning across unstructured subsets of data. Respective models can comprise a neural network and a Bayesian network and can interact with one another.

The analysis component 114 can employ the model(s) 110 to determine impact of the state of respective influencers, determinations, predictions or inferences. The model(s) 110 can be updated using artificial intelligence or machine learning to improve model fidelity as a function of collected data.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, and so on) described herein, one or more components can examine an entirety or a subset of data to which it is granted access and can provide for reasoning about or determine states of a system, environment, and so on from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)$=confidence(class). Such classification can employ a probabilistic and/or statistical-based analysis (e.g., factoring into the analysis utilities and costs) to determine an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence, any of which can be employed. Classification as used herein also is inclusive of statistical regression that is utilized to develop models of priority.

In one or more embodiments, the system 100 can employ icons to help to simplify AI learning. As explained above, the system 100 can facilitate its functionality by continuously recording and/or receiving images, screenshots, and/or extrinsic data 107 via the input component 106. Such images, screenshots, and/or extrinsic data 107 can include images of websites, program/application interfaces, other graphical user interfaces (GUIs), and so on. In general, the organization and/or appearance of websites, program/application interfaces, and/or GUIs can be optimized for human use. For example, websites/GUIs can be designed, organized, and/or arranged so as to be visually appealing and/or otherwise easy to use/maneuver for a human. But, such design, organization, and/or arrangement can, in some cases, not be ideal to facilitate AI learning via image/screenshot analysis. So, inconspicuous on-screen icons can be used to make the website, program/application interface, and/or GUI more susceptible to AI image analysis. Such icons can be composed of several and/or a few pixels on screen such that they are not noticeably visible to humans (e.g., an icon comprising six pixels having particular colors, settings, intensities, and/or arrangements, and so on). For instance, an icon can be several and/or a few pixels organized as one-dimensional or two-dimensional barcodes, and so on. Such icons can be placed on-screen nearby and/or on important buttons, links, and/or other elements of interest, thereby helping the system 100 to more easily recognize and/or learn those buttons, links, and/or elements. Those of ordinary skill will appreciate that other types and uses of such icons can be incorporated.

In one or more embodiments, such icons can be used as markers and/or identifiers that can provide deep links to particular moments in time, to particular recorded screen images, and/or to particular applications/programs, and so on. For example, if a user is conducting online research for a school/work project, an on-screen icon (as described above) can be added to the screen and/or otherwise associated with that research website, thereby providing a deep link (e.g., akin to a hyperlink) to that particular screen and/or website. So, when the user is later searching through his/her recorded on-screen history and/or personal timeline (as described below), the user can quickly call/summon that recorded screen by activating the icon/deep link. This allows the user to quickly and efficiently search through his/her recorded, on-screen history. Moreover, in various embodiments, the user can reopen the actual website and/or webpage itself (e.g., more than just viewing a recorded, on-screen session) by activating the icon/deep link. As a more specific example, consider a user that is using a search engine (e.g., Google) to search for "mechatronic devices." Say that the user proceeds to the third page of Google results, where the user sees internet links of interest to him/her regarding "mechatronic devices." The user can then place an icon on that screen (or the system can automatically place the icon in response to detecting the user's interest in that webpage/screen, or the platform can place such icons as part of its service, and so on), such that the icon provides a deep link to that particular screen in the user's recorded computing history. So, when the user is reviewing his/her recorded computing history, he/she can activate the icon/deep link to quickly navigate to the moment in time when the third Google results page for the "mechatronic devices" search was displayed on his/her screen. Additionally, the user can, in some embodiments, activate the icon/deep link to actually reopen that third Google results webpage, thereby reconnecting the user to that internet webpage and enabling the user to access/select the various links presented on that webpage. Those of skill in the art will appreciate that such deep links can be used to quickly navigate to and/or reopen any type of website, webpage, application section (e.g., a user can activate a deep link to jump to a specific conversation in Slack that happened in the past, including reopening the general conversation/message string so as to see and/or respond to the latest messages, as well as to jump to the actual moment/message that was marked with the deep link even if not the latest message), application programming interface, and so on.

In one or more embodiments, any and/or all of the structured and/or unstructured data recorded by the system can be made available, via an application programming interface, for third-party use. Such uses can include extending, extrapolating, and/or interpolating the data; analyzing the data; incorporating the data into other programs and/or applications; building new applications based on the data; and so on.

Furthermore, in one or more embodiments, the above-mentioned AI capabilities can be implemented via the machine learning component 112 and the reward component 120, in conjunction with genetic and/or other algorithms, to help train the model(s) 110. For example, the machine learning component 112 can continuously (and/or substantially continuously) run the model(s) 110 in the computing background while the user is interacting with the computing device. The model(s) 110 can then continuously (and/or substantially continuously) predict what actions/intentions the user will perform next. If a particular model 110 is correct regarding a particular prediction, that model 110 can be rewarded by the reward component 120. Genetic algorithms can then be used so as to generate new models that are based on the most successful (e.g., most rewarded) model(s) 110.

In various embodiments, such AI capabilities and/or algorithms can be used to create an identity score (e.g., a mathematical function that measures the differences between a particular model's 110 (and/or the entire system's) predicted actions/intentions and the user's actual actions/intentions). The cycle of continuously running models 110, rewarding successful models 110, and breeding, via genetic algorithms, the most successful models 110 can help to optimize the identity score (e.g., to minimize the differences between the invention's predicted outcomes and the user's actual behavior/intentions). In other words, the machine learning component 112 and the reward component 120 can, in various embodiments, create an AI version of the user that runs in a simulated computing environment (e.g., like a virtual version of the user's machine) and that has the opportunity to react to the same on-screen situations as the actual user. The AI methods and algorithms described above (e.g., continuously running and rewarding of models) can be used to make the AI version of the user more accurately replicate/simulate the actual user (e.g., thereby optimizing the identity score). Thus, the models 110 can be run, via the machine learning component 112 and the reward component 120, substantially continuously against the actual user (e.g., a human user) such that the system/models can learn from their mistakes (e.g., incorrect predictions), thereby ultimately generating models 110 that more accurately predict user behaviors, actions, and/or intentions. Those of skill in the art will appreciate that less frequent model training (e.g., less than continuously) can be incorporated.

In one or more embodiments, such AI models and/or algorithms can be used to simulate/generate different and/or alternative interactions that are distinct from what the actual user would do and that can be made available for review by the user. In other words, while the above section discusses how these AI models/algorithms can be used to "see and predict what the user would do," these AI models/algorithms can also be implemented to "see and predict what the user's alter ego would do." That is, rather than simply attempting to replicate how the actual user would behave in a particular computing situation, the AI models/algorithms can be implemented to simulate various, different, and/or alternative approaches/behaviors that can be taken in that computing situation. This could allow the user and/or the system to obtain new insights into the most and/or least efficient responses/actions to particular computing situations/scenarios. For example, the AI models/algorithms can be implemented to predict how the real user would actually go about putting an item up for sale on the internet (e.g., what actions the user would perform on his/her computing device(s) to sell an item on eBay). However, the AI models/algorithms can also be implemented to simulate different methods of selling the item on the internet, including methods/actions that the real user might not perform on his/her computing device(s). These simulations of alternative actions can then be reviewed and/or compared with the user's actual actions (and/or with the system's simulations of the user's actual actions) to determine which are better (e.g., more efficient, more secure, less time consuming, less resource intensive, and so on). To implement such models/algorithms, the reward functions and/or variables, as described above, could be adjusted to favor differently biased actions (e.g., rewarding actions that result in higher focus time, rewarding actions that result in more family time, rewarding actions that result in fewer cyber-security risks, rewarding actions that expend fewer computing resources, and so on).

In one or more embodiments, the avatar component 302 can utilize the above-mentioned AI techniques to help facilitate the system 100 to function as a personal artificial intelligence assistant (e.g., personal AI) to the user. Such a personal AI can, in various embodiments, act (e.g., via the action component 116) as a conduit between the user and external AI systems (e.g., representing external service providers and/or good providers, and so on) with which the user interacts. Such external AIs can include, for example, Amazon Alexa, Siri, online shopping and/or checkout wizards, and so on. For example, the user can instruct, via keyboard and/or voice commands, the system to order something from an online vendor and/or clearing house. In such case, the user can provide the pertinent/desired information to the personal AI (e.g., desired good/service, quantity desired, delivery/pick-up date desired, and so on) via keyboard and/or voice commands, and the personal AI, via the action component 116, can then interact with an external AI program of the vendor/clearing house so as to place the order. In some embodiments, the personal AI can place the order (and/or perform any other specified action) by using data from the Lifegraph and/or Personal Timeline (discussed below) to respond to the queries of the external AI. In such case, the Lifegraph and/or Personal Timeline data can be considered pre-collected briefing information usable by the personal AI, thereby enabling the personal AI to facilitate the user's commands and/or intentions without always having to actively query the user for information. For instance, the personal AI can fill in data fields requested by the external AI and/or answer any data queries from the external AI based on the inputted information and/or other stored information of the user (e.g., credit card number, date of birth, billing address, and so on), which can include, but is not limited to, Lifegraph and/or Personal Timeline data. Those of skill will appreciate that the personal AI can perform similar functions with any external programs, regardless of whether those external programs utilize artificial intelligence/machine learning and regardless of the good/service provided.

Relatedly, the system can, in one or more embodiments, not only perform new actions as instructed by the user, but can also repeat/redo recorded actions, either exactly and/or in the abstract. For example, as described above, the input component 106 can receive and/or record images, screenshots, and/or extrinsic data 107 regarding the user's interactions with the computing system. These recordings can, in some instances, contain images, screenshots, and/or videos of the user performing certain actions/tasks (e.g., ordering a good/service from an online vendor, making an appointment with a good/service provider, booking a flight, sending an email, and so on). In various embodiments, the images, screenshots, and/or videos of the performances of those actions can be replayed exactly, not just to view and/or study them, but also to actually redo, repeat, and/or reperform the recorded actions. For example, if images, screenshots, and/ or videos of the user ordering a good (e.g., body soap) from the internet were received/recorded by the input component 106, the action/task captured in those images, screenshots, and/or videos can be repeated, at the keyboard and/or vocal command of the user, via the action component 116 such that another unit of that identical good (e.g., body soap) can be reordered by the system/personal AI. In various other embodiments, such recorded actions/tasks can be repeated in the abstract (e.g., forming generalized task patterns). For example, the system/personal AI can recognize that certain recorded images, screenshots, and/or videos show the user booking a particular flight with a particular airline. At the keyboard and/or vocal command of the user, the system/personal AI can, via the action component 116, redo/repeat that task pattern in the abstract (e.g., booking a flight for the user on a desired date, with a desired airline, and/or at a desired price, even though such desired date, airline, and/or price do not match the ones shown in the recorded images, screenshots, and/or videos). Those of ordinary skill in the art will appreciate that such exact and/or abstract redo/replay of recorded actions/tasks can be performed regardless of the type of recorded action/task or device. Moreover, those of skill will also appreciate that such exact and/or abstract redo/replay can be based on any type of data available to the system (e.g., video, audio, motion, location, bio-data, and so on).

Moreover, while these abstract patterns can be generated by studying the actions/patterns of a single user, they can also be generated by studying the actions/patterns of any number of users (e.g., thousands of users, and so on). Thus, the "best" (e.g., least expensive, most efficient, quickest, most secure, most reliable, and so on) way of performing an abstract pattern can be determined by analyzing and/or comparing how a plurality of users have previously performed the pattern. For example, consider the overall action of putting an item for sale on eBay. For many people, placing an item up for sale on eBay can be a multistep process (e.g., listing the item, including pictures and/or a written description of the item, printing shipping labels, scheduling shipping services, interacting with a third-party secured transaction processor (e.g., PayPal), and so on). The system/personal AI can create an abstract pattern by recording, analyzing, and/or learning how a single user performs these steps on his/her computing device(s). However, if the system/personal AI has access to the data of hundreds and/or thousands of users, the system/personal AI can generate one or more abstract patterns that cover a variety of categories (e.g., different patterns for selling different types of goods, different patterns for providing different types of photos/descriptions, different patterns for using/obtaining different types of shipping services, and so on), which patterns can then be compared and/or analyzed to find the optimal pattern(s). By analyzing such a multitude of users' patterns (e.g., thousands of patterns/examples of "putting things for sale on eBay"), the system/personal AI can reliably determine/learn what types and/or pieces of information/data are required, which data fields need to be filled out, which shipping services are the most reliable, which patterns are the most profitable, and so on.

In various embodiments, multiple task patterns (e.g., abstract actions, as described above) can be chained together to build larger task patterns. In such case, the larger task pattern can correspond to a complicated and/or overall goal/action to be performed, and the smaller task patterns can correspond to the constituent actions/steps to be performed in order to achieve the overall action. For example, if the user instructs the system/personal AI to make an online appointment with a drywall installer, the system/personal AI can perform that overall goal/action by performing a sequence/chain of smaller tasks. These smaller tasks/task patterns can include searching for nearby drywall installers, vetting and/or checking credentials of located drywall installers, choosing a drywall installer (e.g., based on price, online reviews, and so on), interacting with the website of the chosen drywall installer so as to book an appointment, inputting payment and/or address information, and so on. In some embodiments, the system/personal AI can have previously recorded the user (and/or any number of other users) performing such smaller tasks, and so the system/personal AI can recognize the abstract task patterns underlying each constituent step, as described above. By chaining these general task patterns together (e.g., performing them in sequence), the overall, more complicated goal/action can be achieved. In some cases, the system/personal AI can measure the performance efficiency/efficacy of the chained task patterns, so as to compare with different potential pattern chains for accomplishing the same overall goal/action.

In one or more embodiments, the system (e.g., via the avatar component 302 and/or the personal AI) can create a Lifegraph that can represent all and/or a subset of all the people, objects, and/or relationships that are detectable (e.g., via image and/or optical recognition analysis, any other type of data analysis, and so on) in the images, screenshots, and/or other extrinsic data 107 that are received and/or recorded by the input component 106. As mentioned above, this can further include any and/or all data received by the input component 106, including visual data, non-visual data, bio-data, audio data, geolocation data, motion data, weather data, temperature data, and so on. A Lifegraph (e.g., a Model of the World) can be an n-dimensional (e.g., where n is a positive integer) graph that can represent and/or depict the web of people/objects/relationships connected to the user and/or the system. In some embodiments, the Lifegraph can depict and/or record how these people/objects/relationships change through/over time. For example, if a user sent an email to person A, held a telecommunication session (e.g., via Skype) with person B, and instant messaged and/or posted a message to person C (e.g., via Face Book), the system and/or personal AI can recognize that all three of person A, person B, and person C are somehow connected to the user of the system, and so those three persons can be included and/or represented in the Lifegraph of the user. Furthermore, the system and/or personal AI can, in various embodiments, recognize the context in which such persons appear in the recorded data 107 to further define the relationships between the user and those persons. For instance, if the email to person A and the telecommunication session with person B both pertained to a particular academic/work project/assignment, the Lifegraph can show that person A, person B, and the user are all connected in some way via that particular academic/work project/assignment. Similarly, if the instant message to person C did not pertain to that project/assignment, but instead was related to a dinner date, the Lifegraph can show that person C and the user are connected via that dinner date and not via that project/assignment. If more specific information about person A, person B, and person C is discernable from the recorded data 107 and/or otherwise available to the system/personal AI, such information can further be included in the Lifegraph (e.g., names, ages, occupations, and/or familial relations of persons A, B, and C, and so on).

Furthermore, data points, nodes, and/or entries in the Lifegraph can, in some embodiments, be generated by other data streams. For instance, a mobile application can provide location information regarding the user and/or persons A, B, and/or C. So, if a mobile device's location sensor (e.g., GPS sensor, and so on) indicates that the user was at a particular latitude/longitude that corresponds to a gym, the system/personal AI can determine that the recorded latitude/longitude corresponds to the gym (e.g., via an internet search) and can thus include the gym on the user's Lifegraph. Similarly, because the Lifegraph can track people, objects, and/or relationships through time, temporal correlation can be used to further interrelate nodes, entries, and/or data in the Lifegraph. For example, if the user meets with persons A and B in a latitude/longitude that corresponds to a school and such meeting occurs at and/or around the same time that the user and persons A and B send documents to each other pertaining to a particular project, the system/personal AI can note in the Lifegraph that the school location is relevant to the project, and so on.

Moreover, the Lifegraph generated by the system/personal AI can, in one or more embodiments, be queried by the user, the personal AI, and/or a third party (e.g., with sufficient authorization). For example, the user can ask the system and/or personal AI to send a Christmas card/message to the user's "close family contacts." In such case, the personal AI can query the Lifegraph to determine who from the list of people with whom the user interacted can be considered a personal family contact of the user. As explained above, a list of personal family contacts can be included in the Lifegraph by examining and/or analyzing the recorded data 107 (e.g., emails, calls, live messaging, extrinsic data, and so on). Continuing the example from above, person C can, in some cases, be considered a close contact since the subject of a recorded communication between person C and the user pertained to a dinner date (e.g., which seems personal and not work- and/or school-related). Persons A and B, on the other hand, can be considered not close family contacts since the subjects of the recorded communications between them and the user pertained to work/school assignments only, thereby not indicating a close and/or personal relationship. However, if other images, screenshots, and/or data 107 received/recorded by the input component 106 contained communications between the user and persons A and B in a more personal context (e.g., emails between the user and persons A and B discussing whether they would attend a certain family reunion, and so on), the Lifegraph can indicate that persons A and B are, indeed, close familial contacts of the user.

In one or more embodiments, the Lifegraph can include user preferences that can be deduced from the recorded people, objects, and/or relationships and/or their changes over time. The incorporation of screen data and/or non-screen data (e.g., bio-data, location data, motion data, audio data, time data, weather data, and so on) can be used to facilitate deduction of such preferences. For instance, the Lifegraph can record that the user attends a gym (e.g., via geolocation data from a mobile device, and so on) periodically (e.g., with a regular and/or somewhat regular time interval between gym visits). If the time interval between gym visits is relatively short (e.g., a few days), the Lifegraph can note that the user prefers to go to the gym and/or exercise regularly. If, on the other hand, the time interval between gym visits is relatively long (e.g., a few weeks and/or months), the Lifegraph can note that the user prefers to not go to the gym regularly. Any other types of user preferences can be deduced and/or stored in the Lifegraph. For example, if the user often buys an aisle and/or window seat on flights, the Lifegraph can deduce that the user prefers the aisle and/or window seat. Moreover, such preferences (and/or any other information in the Lifegraph) can be available for querying by the personal AI. For instance, if the user researches and purchases a particular car (e.g., purchased online or discussed the purchase via email, and so on), the information about the car uncovered during the online research and/or via the emails (e.g., chassis number, manufacturer, model, price, and so on) can be stored in the Lifegraph and can be available for querying. So, the user can command the personal AI to research insurance options for their vehicle, and the personal AI can access such information to research available insurance options without having to manually receive the input (e.g., chassis, model, price, and so on) from the user. In some embodiments, the personal AI can begin obtaining the insurance (e.g., filling out online information/data fields), such that only the user's final authorization and/or signature is needed to finalize his/her purchase of automobile insurance.

In various other embodiments, the user can navigate through the Lifegraph in time; that is, the user can see how the Lifegraph evolved and/or changed over time. This temporal data can then be used in various analyses to answer various questions (e.g., How many new relationships has the user created in the time interval?; How many projects has the user started and completed during the time interval?; How have the user's relationship intensities changed over time?; How have the user's interests and/or preferences shifted over time?; and so on).

In various embodiments, the system and/or personal AI can create a Personal Timeline/Timeseries of the user and/or the system. For example, all the recorded images, screenshots, videos, and/or other extrinsic data 107 (which can, again, include non-visual/non-screen data such as motion data, audio data, location data, bio-data, and so on) can be multiplexed together into a single structure, which structure can be represented as a file, a video, a database, and so on. The Personal Timeline can represent the computing history (e.g., both direct compute data streams and/or non-direct-compute data streams, and so on) of the user (e.g., all the interactions that the user has had and/or performed on the computing device and/or other computing devices). Such a Personal Timeline can represent a central, comprehensive history of the user's computing interactions (e.g., containing all the user's on-screen interactions from their personal computer, their mobile device(s), their desktop computers, their gaming consoles, and so on; and including all their non-on-screen interactions, such as geolocation data from mobile devices, audio and/or motion data from various other devices, bio-data from bio sensors, information/data from smart appliances, smart cars, smart houses, and so on), and can thus be queried accordingly. That is, all and/or any data regarding the user from all and/or any of the user's smart devices can be multiplexed into a single Personal Timeline/Timeseries, thereby correlating all of such data in time and allowing for easy/efficient navigation through such data by the user and/or the personal AI. Those of skill in the art will understand that the Personal Timeline can represent shorter and/or limited spans of time, in some embodiments. In some cases, the order in which the data (e.g., again, any data from any smart device can be multiplexed into the Personal Timeline, including motion, audio, video, bio, location, temperature, weather, time, and so on) are stored in the Personal Timeline can represent the order in which such data actually occurred and/or was collected chronologically.

In one or more embodiments, various points on the Personal Timeline can be tagged and/or marked for future reference. Additionally, the user can, in some cases, add annotations and/or comments to a particular marked/tagged point on the Personal Timeline. Furthermore, documents and/or files (e.g., downloaded files, edited/created documents, and so on) can be attached to various points in the Personal Timeline, such as to the point at which a particular document was created and/or downloaded. This would allow the user to view and/or access that document and/or file when navigating through the Personal Timeline. It could also visually and/or otherwise correlate that document/file with some, any, and/or all other data in the Personal Timeline that are associated with that point in time. Moreover, such tags, marks, annotations, and/or files/documents can be queried and/or accessed from the Personal Timeline by an application programming interface, and so on.

For instance, the Personal Timeline can, in some cases, be a video file (or a set of images taken substantially periodically over time) along with any other metadata (e.g., audio data, time data, location data, and so on) documenting all the user's actions on the computing device(s) for the past several months. If the user has been working on a long-term assignment/project, the user can query and/or navigate the Personal Timeline so as to see images, video clips, and/or any other data pertaining to the user's work on the project over the past several months. If the user found a particular image and/or video snippet that was of particular importance (e.g., an image of a special website source that was consulted for the project, and so on), the user can mark/tag that image/video segment in the Personal Timeline and can add an appropriate annotation for later reference. Again, the Personal Timeline can include any type of data collected by the input component 106, including visual/on-screen data and/or non-on-screen data (e.g., audio, motion, location, weather, temperature, biological, temporal, and so on).

Furthermore, the Personal Timeline can, in various embodiments, correspond to (and/or be used to create) a stored visual history of all visited and/or viewed webpages and/or programs that were displayed on screen (and any other data collected by the system, including non-on-screen data, as described above). In some embodiments, the full visual history can be available through Spotlight and/or Microsoft analog for navigation/querying by the user.

In some cases, the visual history can include the percentage of a displayed webpage that was actually displayed on screen (e.g., if a user opens a scrollable webpage and scrolls through only 75% of it, the Personal Timeline/visual history can note that only 75% of the webpage was viewed at that point in time. In some embodiments, the amount of a particular webpage that was unscrolled/unviewed can be displayed/noted.

In still other embodiments, the Personal Timeline/visual history can keep track of all windows that were opened by the user, whether or not those windows were actually displayed on screen (e.g., hidden by other windows, minimized, and so on).

In some embodiments, a plurality of users (e.g., thousands and/or millions of users) can use the disclosed system. In such case, a central, global storage pool of website data can be created, which can include any and/or all website pages and/or screens seen (and/or opened but hidden) by any and/or all of the users. Thus, the global storage pool can be considered a substantially complete record of all historical website data viewed by any of the users, thereby allowing any recorded website to be requested/summoned, including website pages that are no longer functional and/or available on the internet.

In one or more embodiments, the system/personal AI can perform automated clustering of timeline segments from the Personal Timeline/visual history. As explained above, the Personal Timeline/visual history can represent the entire on-screen history of the computing device (e.g., every screen image displayed by the computing device and/or other devices for a defined and/or indefinite time period) as well as any other data from any and/or all of the user's other devices (e.g., audio data, motion data, location data, weather data, bio-sensor data, time data, temperature data, and so on). However, in some cases, not every data cluster is substantively related to the other data clusters in the Personal Timeline. In such case, the system/personal AI can divide the Personal Timeline and/or visual history into separate segments/clusters that correspond to a particular substantive task/action performed by the user. This can improve the searching and/or querying efficiency pertaining to navigating through the Personal Timeline/visual history. This can also help to teach the system/personal AI to facilitate the detection/classification of user intentions and/or actions. Moreover, this can help to teach the system/personal AI to determine which tasks/assignments the user has worked on without being distracted and which tasks/assignments the user worked on with significant distractions and/or breaks/lapses in focus.

For example, consider a Personal Timeline that contains thirty stored minutes of screen image and/or video data (and/or any other data, as described above). The first ten minutes of the Personal Timeline can contain screen images/videos of the user working on a school paper/assignment. The next five minutes can contain screen images/videos of the user checking an email account. The next three minutes can contain screen images/videos of the user browsing on the internet. Finally, the last twelve minutes can contain screen images/videos of the user continuing to work on the school paper/assignment. The system/personal AI can recognize that the first ten minutes can constitute a first time segment/cluster pertaining to the substantive task/action of writing a school paper. This cluster/segment can be accordingly marked, tagged, annotated, and/or otherwise distinguished from the rest of the data in the Personal Timeline/visual history (e.g., automatically marked and annotated by the system/personal AI, and so on). The system/personal AI can also recognize that the next five-minute and three-minute intervals respectively pertain to the separate substantive tasks/actions of checking emails and browsing the internet, and do not pertain to the substantive task/action of writing the paper. So, a second time segment and a third time segment can be accordingly marked/tagged/annotated in the Personal Timeline by the system/personal AI. Lastly, the system/personal AI can recognize that the final twelve minutes pertain to the substantive task/action of writing the paper. Thus, those twelve minutes can be marked/tagged/annotated as being part of the same time segment/cluster as the first time segment (e.g. pertaining to the paper/assignment). Now, if the internet browsing involved searching for sources for the paper/assignment, the system/personal AI can recognize this (e.g., via image and/or word analysis), and thereby include that three-minute interval in the first time segment/cluster (e.g., pertaining to the paper).

Those of skill in the art will appreciate that various embodiments of the present invention are not limited to segmenting the Personal Timeline/visual history into minute segments. Instead, any time interval can be used (e.g., years, months, weeks, days, hours, minutes, seconds, sub-seconds, and so on). Indeed, the Personal Timeline/visual history can be segmented into infinitely small segments of time and is not constrained to clustering/segmenting based on periodic, regular, and/or recurring time intervals. Additionally, those of skill in the art will appreciate that the clustering/segmenting discussed above can be implemented with any type of data stored in the Personal Timeline/visual history (e.g., visual/on-screen data, audio data, motion data, bio-sensor data, location data, weather data, temperature data, and so on).

In various embodiments, the system/personal AI can perform such clustering/segmenting by using image analysis, focus object/section analysis, wordspace analysis, audio analysis, bio-data analysis, and/or any other data analysis and/or detection technique. In various embodiments, the system/personal AI can determine that all screen images which display at least part of a particular image and/or focus object/section are related to the same substantive task/action. To continue the above example, the system/personal AI can, in some cases, recognize that the user was working on the paper/assignment during the first ten minutes and during the last twelve minutes because the word document in which the user was writing the paper/assignment was displayed on the screen of the computing device during those time periods. Similarly, the system/personal AI can determine that the five-minute and three-minute intervals did not pertain to the substantive task/action of writing the paper because the word document in which the user was writing the paper/assignment was not displayed on the screen (e.g., minimized and/or hidden behind the email webpage and/or internet webpage, and so on). Likewise, the system/personal AI can determine that only the five-minute time period pertained to checking emails since the email account webpage was displayed on the screen only during those five minutes, and so on. Now, if the paper/assignment pertained to a certain topic (e.g., American colonial history), the system/personal AI can use wordspace analysis and/or object detection to further interrelate time segments. For example, the system/personal AI can recognize key terms (e.g., via OCR, and so on) in the word document, and can determine that such key words (e.g., "American history," "colonial," "George Washington," and so on) appeared on the screen during the three-minute time interval in which the user browsed the internet. Thus, the system/personal AI can mark, tag, and/or annotate that the three-minute interval is indeed related to the paper/assignment, notwithstanding that the focus object (e.g., the word document) was hidden and/or otherwise not displayed on the screen during that time period. Moreover, a combination of wordspace and object detection can be used to facilitate such features.

In various embodiments, the Personal Timeline, the visual history, and/or the monitoring of nonvisible/hidden windows can be simultaneously leveraged by the system/personal AI in order to build a background model of relatedness that can present the user with specialized work rooms depending on the substantive task/action on which the user is currently working. For example, if the user is preparing a word document relating to a school project (e.g., engineering lab report), the system/personal AI can detect the word document (e.g., via image/OCR analysis) and the topic of the paper (e.g., via wordspace analysis). Moreover, the system/personal AI can automatically minimize, cancel, and/or otherwise hide any other windows, programs, and/or notifications that are not substantively related to the task at hand (e.g., writing the engineering lab report). Thus, an open Facebook webpage can be hidden and/or otherwise not displayed on the screen, while an email account displaying a conversation with a classmate of the user about the engineering lab report (e.g., again, recognizable via wordspace analysis) can remain on the screen, be brought to the front of the screen if otherwise hidden, and/or be resized so as to share the screen with the word document. Additionally, an internet webpage that pertains to the topic of the engineering lab report (again, recognizable via image and/or wordspace analysis) can also be brought to the front of the screen along with the email conversation and the word document, thereby allowing the user to quickly view all windows and/or programs that are pertinent to the lab report without having to sift through multiple hidden windows, thereby avoiding distraction. In this way, the open windows/programs that are most relevant to the user's current task/action can be automatically presented on the display screen while those that are least relevant can be blocked, suppressed, and/or hidden. This can also occur based on other, non-visual information to preserve a moment of flow (e.g., moment when the user is most concentrated and/or in a creative sweetspot). For instance, if the system/personal AI detects that the user is focused and/or concentrating (e.g., via bio-data and/or EEG readings, and so on), windows, programs, and/or notifications that are relevant to the task on which the user is focused can be displayed on screen while those that are irrelevant and/or potentially distracting can be suppressed and/or hidden.

Furthermore, in various embodiments, the system/personal AI can keep potentially relevant windows, programs, and/or notifications (e.g., that are not necessarily pertinent at the moment) prepared and/or at hand, such that the user can quickly/easily access them if needed without becoming significantly distracted or losing his/her train of thought. To continue the above example, the engineering lab report may require the inclusion of several graphs. If the user is not yet prepared to include the graphs but has nonetheless opened/accessed the graph files, the system/personal AI can minimize the graphs, place them in a corner of the screen, and/or keep them behind a quick interaction button/icon, allowing the user to quickly and easily access the graphs when needed. This can significantly improve the flow of work by reducing the time spent by the user on simply searching for the desired files (e.g., sifting through a plurality of open and/or hidden windows).

In various embodiments, the Personal Timeline, visual history, and/or other stored images, screenshots, and/or extrinsic data 107 (e.g., any type of data recorded by any type of device, as described above) can contain/depict sensitive and/or private information (e.g., credit card numbers, social security numbers, home addresses, passwords, and so on). The system/personal AI can ignore and/or otherwise camouflage (e.g., via blurring) such sensitive information to ensure that such information is not accidentally revealed if someone other than the user queries and/or navigates the Personal Timeline and/or visual history.

Such sensitive information can be recognized via the above-mentioned image analysis. In various embodiments, such user specific data can be otherwise recognized by identifying what information particular data fields are requesting from the user. Additionally, if there are multiple users of the system, the system/personal AI can compare the on-screen images (and/or any other data, as mentioned above) of the various users to determine which information is user specific and which is not. For instance, if a plurality of users inputted information into an airline website to purchase tickets, the system/personal AI could compare the various airline webpage screens from the various users to determine that the differences between the screens (e.g., user names, addresses, payment information, and so on) are user-specific data while the unchanging portions between the screens (e.g., airline instructions, and so on) are not user-specific. Moreover, in such case, different users can be shown (and alerted to the fact that they are shown) variations of data shown to other users. For instance, different users may look at the same airline ticket website and yet be shown different frequent flier points and/or bonus miles (because such points and/or bonus miles can depend on the user and/or whether the user is viewing a particular offer/advertisement, and so on). Thus, the system/personal AI can inform a user that he/she is viewing a better and/or worse deal than other users, and so on.

Once identified, the user specific information can be automatically blurred and/or pixelated. As another example, private communications in an email program or an instant messaging application can be blurred, and so on. Similarly, personal information on any and/or all screen sharing sessions, transmitted video recordings of the user's screen(s), and/or any other communication/transmission from the user's device(s) can be censored and/or blurred in real-time by the system/personal AI to ensure that such personal information is not unintentionally shared with unauthorized third-parties.

Similarly, in various embodiments, the system/personal AI can be configured to use private/sensitive user information related to a particular user account (e.g., credit card number, social security number, account password, and so on) without being able to read and/or otherwise reveal such information to third parties without authorization. For example, if a user orders a good/service from an online vendor, the personal AI can interact with the vendor's website, provide the user's payment information, and thereby order the good/service. However, the personal AI can be prevented from otherwise sending and/or revealing such private information to other third parties (e.g., third parties who are not bona fide online vendors) without first receiving some type of affirmative authorization from the user. In some embodiments, the user can provide advance authorization for the personal AI to share such information.

In one or more embodiments, the Personal Timeline/visual history can be used to detect the creation of loose-end commitments (e.g., otherwise known as "open-loops") and/or to get confirmation on whether such loose-end commitments have been resolved. That is, the system can detect (e.g., via image analysis, OCR, and/or word analysis by the machine learning component 112 and/or the analysis component 114) an open-ended question, request, invitation, query, and so on generated by the user and/or received by the user but that has not yet been resolved. For example, if the user receives a message (e.g., email) from person X asking "Do you want to meet at 3:00 pm?," the system/personal AI can note when, where, and how the message was received (e.g., via tags/marks/annotations in the Personal Timeline and/or visual history) and can mark the question/email as an open-loop until the user responds to it. In some embodiments, the system/personal AI can ask the user at a later time whether or not the user answered/addressed the question/open-loop. As another example, if the user sends a message to person Y asking "How's the project?," the system/personal AI can keep track of when, where, and how that message was sent and can mark the message/question as an open-loop until person Y responds. In some cases, the system/personal AI can notify the user at a later time if a response has been received. If a response has not yet been received, the personal AI can, in some cases, send a notification to that effect to the user. In various embodiments, an inventory of these loose-ends/open-loops can be created, which inventory can be navigated/queried by the user.

In one or more embodiments, the system and/or personal AI can use bio-data (e.g., EEG data, heartrate data, body temperature data, motion data, micromovement data, breathing data, and so on) described above (which can also be included in the Personal Timeline/Timeseries) to help monitor the emotions, sentiments, thoughts, and/or intentions of the user. More specifically, the user can, in various embodiments, operate the system/computing device(s) while wearing a suitable EEG device, heartrate monitor, thermometer, motion-capture device, and so on. In such case, one or more of the user's brainwaves, facial expressions, and/or other bodily responses can be recorded as the images, screenshots, and/or other extrinsic data 107 (again, which can include any data from any type of device) are simultaneously received/recorded by the input component 106. So, the bio-data can be correlated in time with the recorded images, screenshots, and so on (e.g., multiplexed and/or attached to the Personal Timeline/visual history, and so on). These correlations can teach the system/personal AI how the user's brain and/or body characteristically respond to certain on-screen and/or off-screen stimuli (e.g., notifications, pop-ups, received emails, sounds, locations, movements, and so on). Moreover, such bio-data can then be used to help predict the user's intention and/or behavior (e.g., by recognizing previously recorded brainwave patterns, bodily responses, and so on). As an example, the system/personal AI can record brainwaves and/or bodily responses of the user, which appear similar to brainwaves and/or bodily responses previously recorded when the user was in a mental state in which the user was highly productive and not distracted. In such case, the system/personal AI can recognize that the user has entered a creative sweet spot, and so the system/personal AI can temporarily suppress notifications, pop-ups, and/or other on-screen and/or off-screen distractions that could potentially bother the user and/or otherwise knock the user out of the mental sweet spot.

In various embodiments, the system/personal AI can leverage the data (e.g., bio-data and/or any other type of data receivable by the input component 106) to detect pattern precursors to distractions. For example, the system/personal AI can detect certain on-screen and/or off-screen patterns that suggest that the user is distracted (e.g., aimless clicking/scrolling, jiggling the cursor, and so on). These on-screen and/or off-screen patterns can, in some cases, be verified with the bio-data (e.g., as the user performs such distracted actions/tendencies, the user's brainwaves and/or bodily responses display patterns that the user previously displayed when distracted, such as fidgeting/restless legs, sighing, daydreaming, and so on). By detecting these distraction precursors, the system/personal AI can take remedial action if possible (e.g., suppressing notifications, closing unnecessary/distracting windows/programs, notifying the user that distraction and/or lack of concentration are imminent/occurring, and so on). Moreover, the system/personal AI can use the collected bio-data (and/or any other data) to create a productivity score for the user (e.g., a score indicating how productive/unproductive the user currently is based on their brainwaves, bodily responses, and/or on-screen actions).

Similarly, the system can recognize various triggers from the EEG data (and/or any other bio-data). In some cases, the system can passively learn (e.g., as explained above) how the user's brain and/or body respond to various stimuli/triggers. In some cases, the system can facilitate active training to recognize how the user's brain and/or body respond to various stimuli/triggers (e.g., showing the user images and/or other sensory input and then recording the user's brainwaves and/or other bodily responses, like micromovements, heart rate, breathing rate, temperature, and so on). Such measured brainwave and/or bodily response patterns can represent a user's intention to perform a particular task and/or action. Specifically, the system can learn which brainwave and/or bodily response patterns of the user correlate/correspond to which intended actions (as described above), and the system can then perform those actions/tasks and/or begin preparation for those actions/tasks. For example, the system could detect the brainwaves and/or bodily responses that are recognized (from either active training and/or passive learning) to represent the intention to create a note. The system could then prepare the user's device(s) by automatically unlocking and preopening the note application so that the user can start typing the note without having to first pick up the device, unlock it, find the correct note-taking application, open it, go into the editing mode, and finally begin editing. This can greatly reduce the likelihood that the user forgets what it was that he/she wanted to write down. More generally, the system can detect brainwaves and/or bodily responses that correspond to brainwaves and/or bodily responses previously detected immediately before the user selected a particular application/program. In such case, the system can recognize that the user intends to select such program again, and so the system can automatically do so for the user.

Similarly, in various embodiments, the system can measure whether or not such detected intentions are eventually fulfilled. So, if the system detects that the user intends to perform a certain task, the system can determine, and/or query the user regarding, whether that task was actually performed. For example, if the system determines that the user intends to schedule an appointment with person J, the system can wait for a defined amount of time (e.g., a day) to see if the user follows through with such intention. If the defined amount of time elapses (e.g., a day passes) without the system detecting the creation of such an appointment (e.g., via image analysis of on-screen displays of one or more computing devices of the user), the system can notify the user that such appointment has not yet been made, thereby reminding the user. The system can also note (e.g., in the Personal Timeline and/or Lifegraph) that an open-loop has been created (at least until the user responds and/or otherwise fulfills the intention).

In various embodiments, the system/personal AI can, after detecting/determining a user's intent, provide access to the intent on a marketplace (e.g., an online marketplace). This marketplace could allow service providers and/or product providers to directly, and/or via AI conduits, bid on the opportunity to fulfill a user's intention. This can occur automatically and/or upon the user's request. In other words, bidding can occur by which individuals/entities on the marketplace compete (e.g., bid) for an opportunity to fulfill the intent for the user. For example, if a user wishes to purchase a plane ticket to a particular destination on a particular date, the airline service providers on the marketplace can bid (e.g., offer prices) to the user, in hopes of getting the user's business. In some cases, the winning bid can be chosen by the user. In other cases, the winning bidder can get priority in fulfilling the user's intent (e.g., having the winning provider communicate with the user via the system/personal AI to discuss potential prices, and so on). In various embodiments, underbidding/competition between the service/product providers can occur, by which the bidders consecutively decrease their offered prices in the hopes of obtaining the user's business. In such case, the user can select a single winning bid that can be instantly confirmed (e.g., the system/personal AI can automatically begin transacting with the winning provider to fulfill the user's intent).

In some cases, the user can be presented with a small set of several top bids (e.g., due to a combination of low price and high quality, and so on).

In some embodiments, reverse bidding can occur by which different users of different computing devices compete (e.g., bid) for an opportunity to have a scarce service/product provider on the marketplace fulfill their intent. In other words, while the normal bidding process described above can involve multiple service/product providers consecutively lowering the prices that they are willing to accept so as to convince a user to purchase from them, reverse bidding can include multiple users consecutively increasing the prices that they are willing to pay so as to convince a service/product provider to sell to them.

In some cases, limited and/or full access to the user's Lifegraph and/or Personal Timeline can be granted to the entity that is to fulfill the user's intent, thereby allowing the entity to better learn how the user would like their intent fulfilled. For example, the system/personal AI can detect (as described above) that the user would like to purchase tickets to a particular concert/event. Moreover, the Lifegraph can include data indicating that the user has traditionally purchased concert tickets corresponding to seats in the front of the concert hall/stadium. So, the system/personal AI can then inform the marketplace of the user's intent, can search for available concert tickets for seats at the front of the stadium, and can accept (in the case of bidding) and/or bid for (in the case of reverse bidding) a third-party's offer to fulfill the intent (e.g., to obtain the tickets for the front-row seats for the user). In the case of purchasing airline tickets, the Lifegraph of the user can note that the user traditionally prefers aisle seats. So, the system/personal AI can use this data to narrow the marketplace search for a service/product provider (e.g., only searching for airline tickets that have available aisle seats, and so on). In the case of purchasing a car or car insurance, the Lifegraph can include any information pertaining to the user's vehicle that the user may have researched online and/or discussed in an email (e.g., car ID number, dealership, dealership location, price, and so on). So, the system/personal AI can interact with an online service/product provider (e.g., the car dealer's website, the car insurer's website, and so on) and can provide such information from the Lifegraph to the online service/product provider (e.g., pre-filling the data fields in the provider's website with relevant information from the Lifegraph). In various embodiments, the system can even access/query the Lifegraphs and/or Personal Timelines of multiple users (e.g., thousands of users).

In some embodiments, the system/personal AI can allow fulfillment-only data access (e.g., access to the user's Lifegraph and/or Personal Timeline) to the market entity. Because some specific intents can require the input of sensitive/private information (e.g., credit card number, social security number, home address, and so on), the market entity can be granted access to such data of the user (e.g., Lifegraph, Personal Timeline, and so on). However, to prevent misuse of such data, the system/personal AI can encrypt the data and/or otherwise protect the data such that it can be used (e.g., for fulfillment of the intent) without being otherwise read, copied, and/or extracted from the user's Lifegraph, Personal Timeline, and so on.

In one or more embodiments, the Personal Timeline can display all files and/or documents that were downloaded on one or more user devices over any given time interval. Conventionally, the "download folder" on most personal computing devices receives every file downloaded onto the device, regardless of file type, time of download, and so on.

To help make sense of this "file dump," the system can, in various embodiments, include all the downloaded files/documents on the Personal Timeline according to type of file/document, when downloaded, source of the download, relating to certain user intents/actions/tasks, and/or so on. In some cases, the downloaded files/documents can be appended to the Personal Timeline (e.g., similar to annotations). In other cases, the downloaded files/documents can be displayed on a dedicated "downloaded files" view of the Personal Timeline. For example, the user could search the Personal Timeline for all downloaded files/documents according to any kind of search criteria (e.g., all files that were downloaded within the past two weeks, all files that were downloaded from a particular webpage, all files that were downloaded while the user was at a particular location, and so on). In some embodiments, the interrelationships between these various downloaded files can be represented visually in a manner similar to the Lifegraph (e.g., a web of interconnected icons representing the files, and so on). Those of skill in the art will appreciate that the Personal Timeline can be used in this manner for any collection of files, and not solely for downloaded files.

In one or more embodiments, the Personal Timeline and/or Lifegraph of the user can be stored on computer-readable storage media and/or in the cloud and can be downloaded from and/or onto one or more user devices. As explained above, the Personal Timeline and/or Lifegraph of a user can transcend any particular computing device. Although the Personal Timeline and/or Lifegraph can represent the comprehensive on-screen and/or off-screen computing history of a given computing device (e.g., laptop, desktop, personal digital assistant, smart phone, and so on), it can, in some embodiments, represent the comprehensive on-screen and/or off-screen computing history of the user himself/herself (e.g., of all the smart devices and/or sensors that the user uses, including laptop, desktop, personal digital assistant, smart phone, game console, bio-sensors, smart house, smart car, smart appliances, and so on). In such case, the user's Personal Timeline and/or Lifegraph can be considered as a user profile and/or user account that can contain any and/or all computing data pertaining to the user and which can be transferred and/or shared between computing devices. In such embodiments, various computing devices and/or applications/programs that request user accounts/profiles can be satisfied by receiving a copy of the user's Personal Timeline and/or Lifegraph.

In various embodiments, the system/personal AI can extract and/or identify a core set of relevant variables out of a multi-variable system displayed on the computing screen, thereby further improving the ability of the personal AI to learn and/or otherwise interact with the displayed program/webpage. Because, in some cases, not all the possible variables carry substantive importance to the user's actions on the computing device(s), the system/personal AI can ignore such minimally important variables and instead focus on learning the most/more important ones. For example, a particular webpage (e.g., Facebook page) can have a plethora of variables and/or clickable links on it (e.g., a post button, a delete button, an edit button, a like button, a comment button, a share button, an add-friend button, various hyperlink buttons, a settings button, a marketplace button, a camera/photos button, an "about" button, a messages button, and so on). The system/personal AI can, in some embodiments, be explicitly programmed (e.g., hard-coded) to detect and/or pay attention to only a select subset of those many variables. In other embodiments, the system/personal AI can infer, based on watching which variables the user routinely interacts with, which variables are relevant and which are not.

In one or more embodiments, the system can be implemented to comprehensively record employee actions and/or computing histories. For example, an employer can require his/her employees to use computing devices outfitted with one or more embodiments of the disclosed system. In such case, each employee's computing behavior (e.g., on-screen and, in some cases, off-screen) can be comprehensively recorded and stored for later review. This can enable the employer to reliably monitor his/her employees (e.g., to search for slackers, to provide record evidence in pay and/or labor disputes, and so on), which can otherwise be daunting and/or nearly impossible if very large numbers of employees require monitoring. Moreover, the system can analyze such employee records to compile a list of notable computing actions/tasks (e.g., Which tasks are the most commonly performed by the employees overall?; Which tasks are the most/least time-consuming overall?; Which task patterns expose the company to the least cyber security risk?; and so on). By compiling this information and making it readily available to the employer, the employer can determine how to streamline and/or otherwise improve his/her employees' computing behaviors. For example, the system can determine that most employees have to constantly/frequently open a particular folder, select a particular file, copy information from that particular file, and paste it in different particular file. In such case, the employer can decide to streamline the process for the employees by creating pre-filled forms that already have the requisite information copied therein (thereby eliminating the copy/paste steps) and/or to otherwise make a shortcut to the copy/paste file (thereby reducing the time it takes to complete the copy/paste task), and so on.

Figure 4:
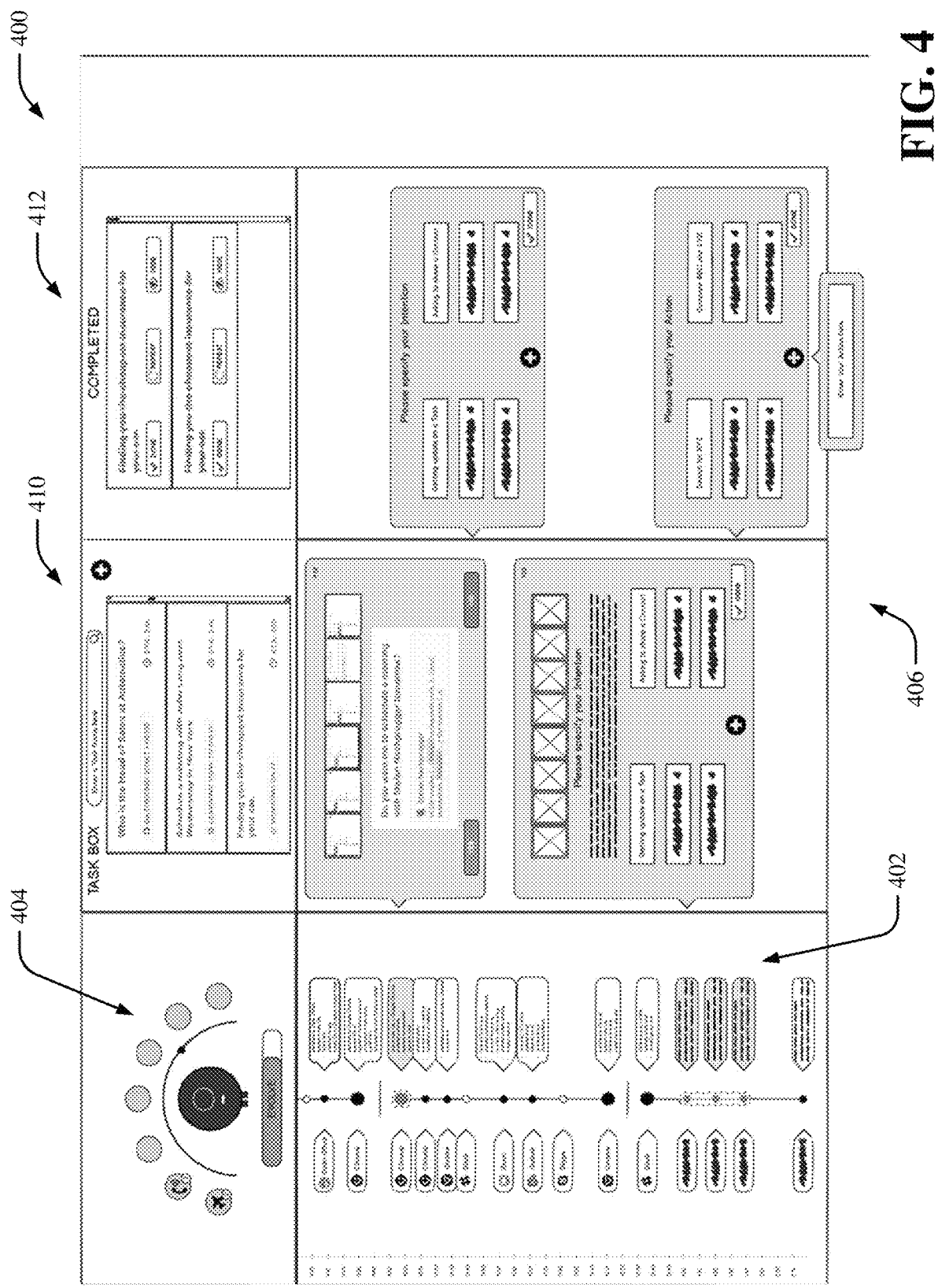
FIGS. 4-7 illustrate example user interfaces and associated components in accordance with one or more embodiments described herein.

The following figures illustrate potential instantiations of the above-described embodiments. FIG. 4 illustrates an example dashboard interface 400 in accordance with system 100. Section 402 of the interface illustrates a time series chart of actions (e.g., opened up Chrome, checked stock market prices, zoomed in on an image, handled email, engaged in a Skype call, and so on) taken by a user in connection with computing interaction. A gaming component interface 404 represents status of training of the model 110 and associated functionalities achieved as well as path to achieving a comprehensively trained model (e.g., level of evolving). Section 406 of the dashboard provides interface (s) for training the model 110, where a user can explicitly input (e.g., type, verbal, gesture, and so on) intentions, and the model 110 can interact with the user by asking questions or seeking confirmation regarding determined or inferred intent. Users can specify intentions or actions through dialog boxes and/or via voice commands At section 410, a user can input tasks into a task box for the model 110 to facilitate executing, e.g., autonomously or partially. At 412, the user can confirm completion of the task, rate the performance, re-task, and so on.

Figure 5:
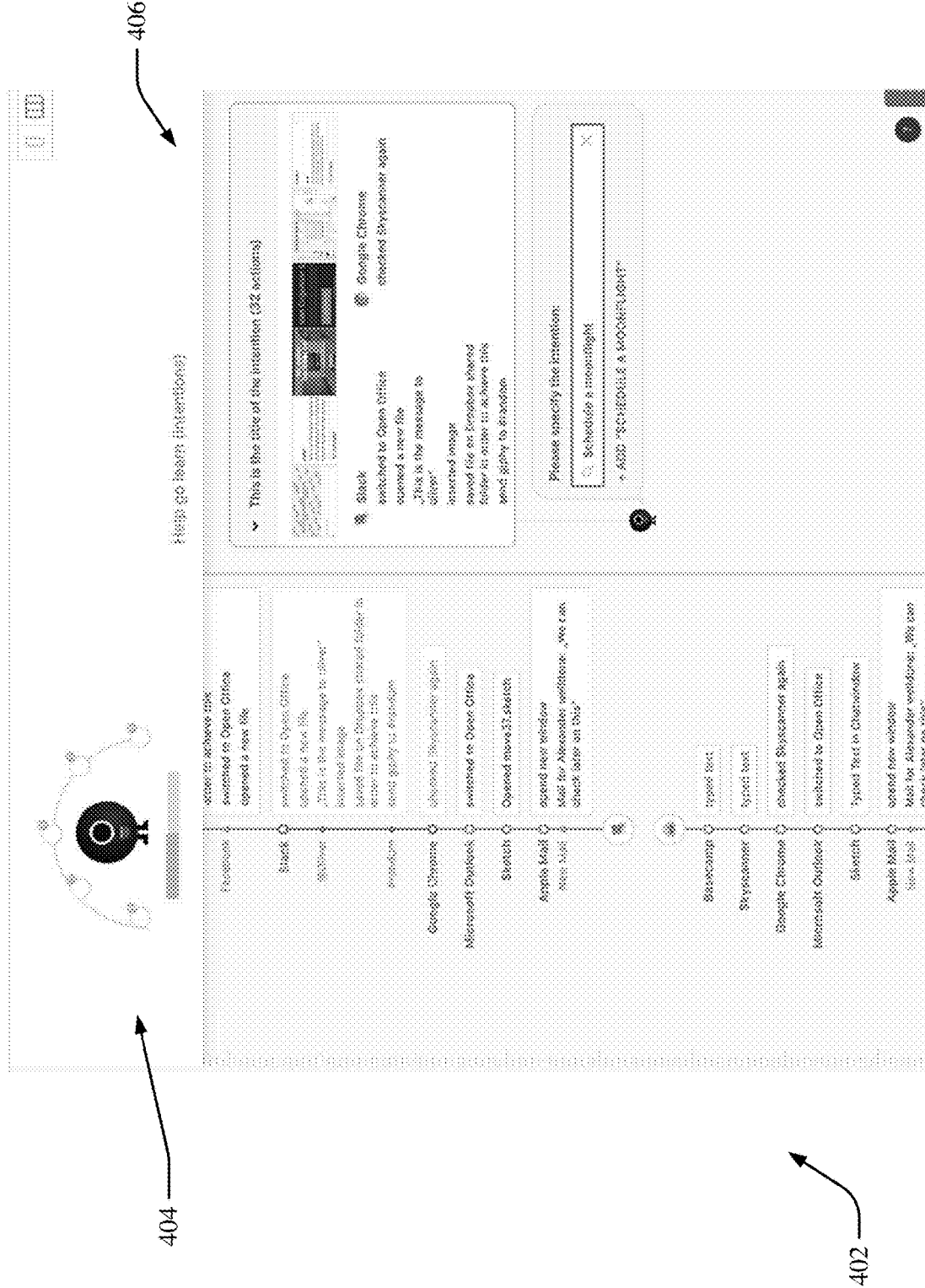

FIG. 5 illustrates a detailed example of the dashboard time-line 402 with respective identified actions presented in time series, and progress of training of the gaming component interface. Section 406 is illustrated in a manner where intentions can be labeled and explicitly provided with deep granularity.

Figure 6:
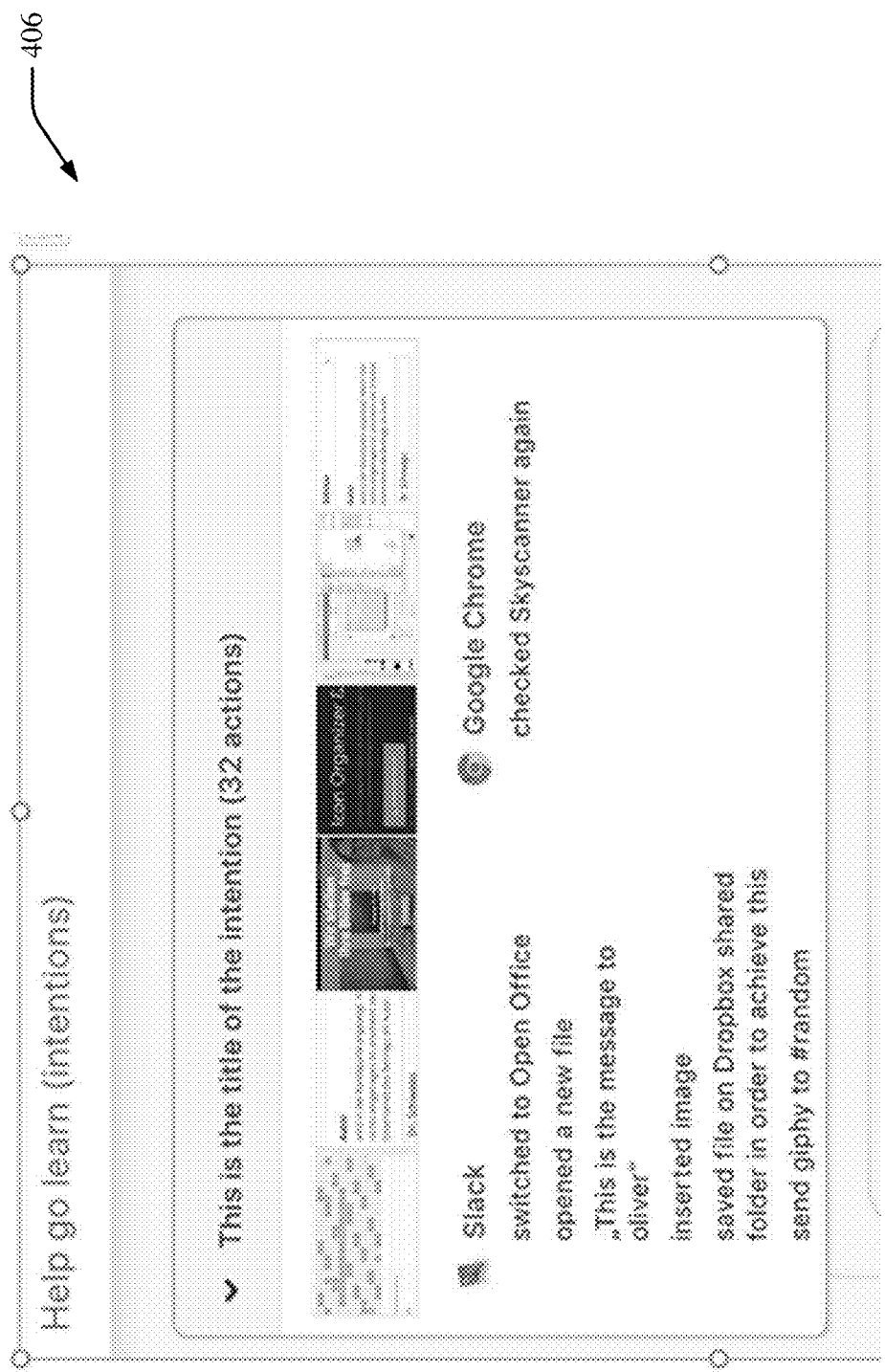

FIG. 6 illustrates an interface where the system 100 is learning intentions of a user, and can categorize intentions in the form of a library of intentions to draw upon in connection with determining, predicting or inferring intentions and taking action based on such inference, prediction or determination. A catalogue of collected screens is kept to recalculate and refine intentions as the algorithm quality improves. Additionally, similarity and confidence scores can be displayed here.

Figure 7:
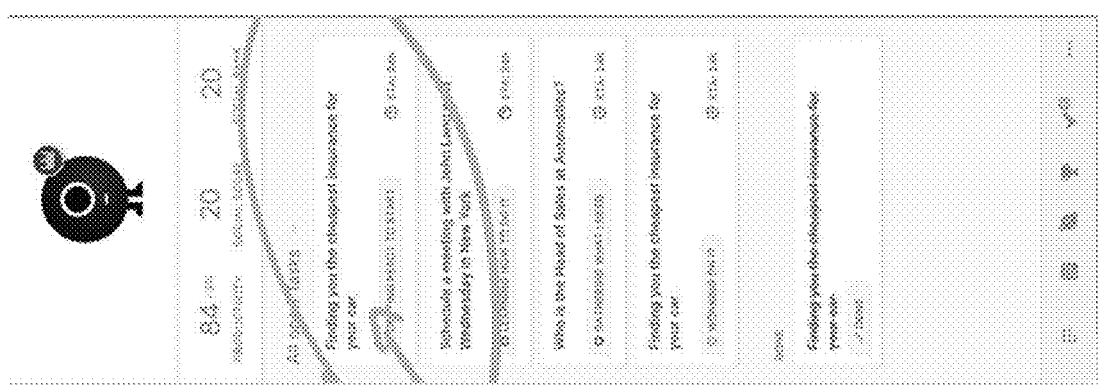

FIG. 7 illustrates an interface showing status of the gaming component including tasks that can be accomplished by the system 100. FIG. 7 illustrates an interface showing a visual representation of the AI, the productivity score representing the time gained by having GO take over tasks and gaming components showing the user's personal score and the user's current rank on the leaderboard. Current Tasks being performed by the AI are shown with current estimates for turnover/completion times. A specific status workflow shows each task's position within the process of learning to the process of completion.

Figure 8:
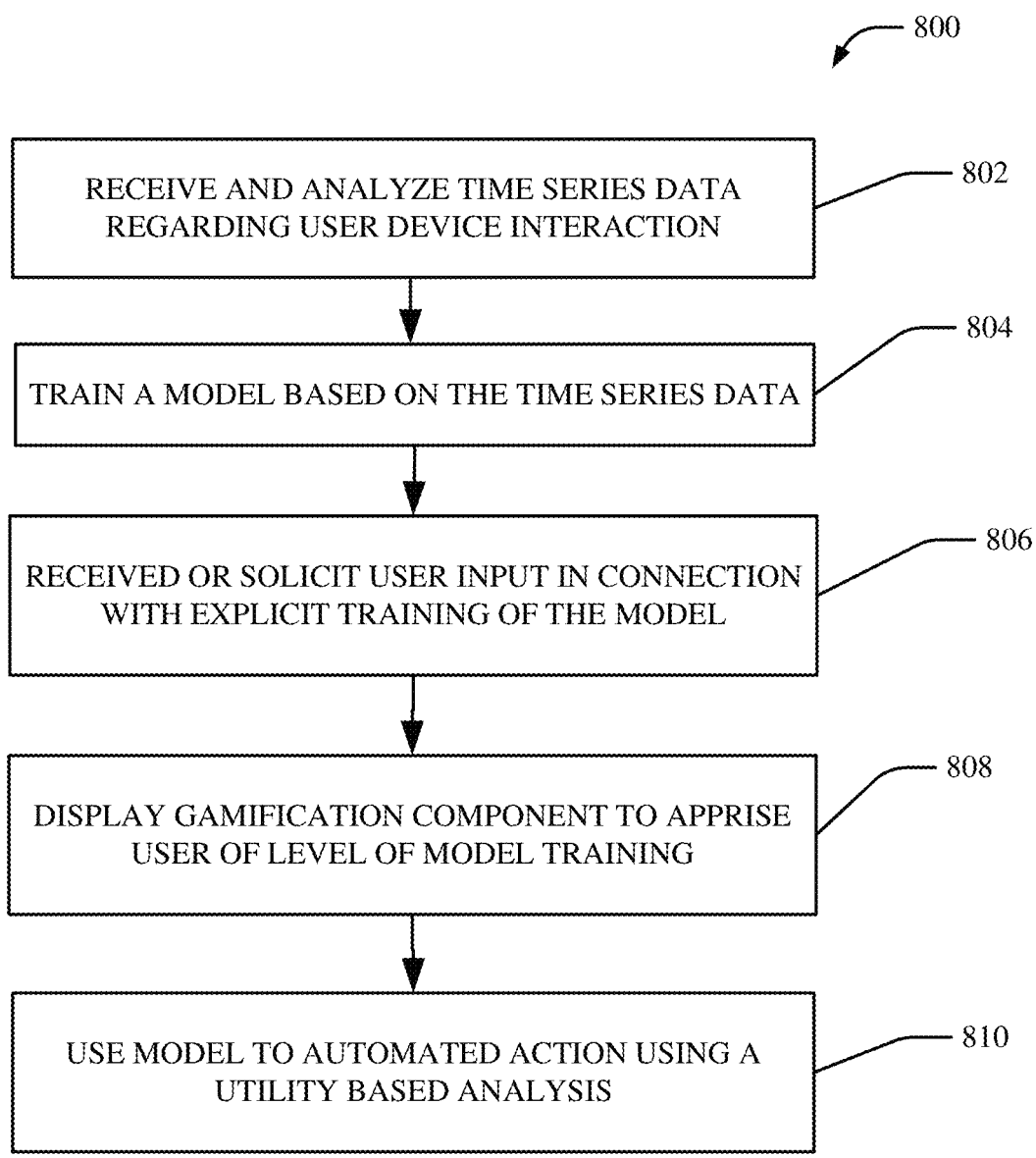
FIG. 8 illustrates an example, non-limiting methodology in accordance with one or more embodiments described herein.

FIG. 8 illustrates an example, non-limiting methodology 800 in connection with an implementation to facilitate determining or inferring user intent. For simplicity of explanation, the computer-implemented method(s) are depicted and described as a series of acts. It is to be understood and appreciated that the subject innovation is not limited by the acts illustrated and/or by the order of acts; for example, acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

At 802, the methodology receives (e.g., using an input component) time-series data regarding state of a subset of influencers (e.g., screen captures of a display, audio information, motion information, location information, optical character recognition (OCR) information, video information, 360°/panoramic recordings, and so on) with respect to user interaction in a computing environment. The time-series data is analyzed and employed at 804 to train a model in connection with determining, predicting or inferring a user's intentions. At 806, the method receives or solicits user input regarding intent or confirmation of intent in connection with further training the model, e.g., implicitly or explicitly. At 808, a gamification component is displayed to the user representing level of training of the model and capabilities or functionalities associated with the model as currently trained. In an aspect the gamification component information can be shared with third parties to facilitate sharing of training status. At 810, the model can take automated action based on its training and determined, predicted or inferred intent while employing a utility-based analysis where the benefits of taking a correct automated action are weighed against the costs associated with taking incorrect automated action.

Turning now to FIGS. 9A-9J, an embodiment of the innovation provides for viewing computing device interaction done in the past in a video-like format. Past device interaction can be viewed across one of more devices (e.g., laptop, desktop, cell phone, tablet, television, gaming console, and so on). Thus, some, most or all computing device interaction can be recorded, indexed and archived in a video format for subsequent search, retrieval and viewing. In some embodiments, various metadata (whether or not enriched) can be multiplexed into and/or otherwise attached to the recorded, indexed, and archived video file to correlate such metadata with the user's on-screen actions. As described above, such metadata can include audio, location, bio-data and so on. Such feature allows for a user to see in a visual manner his/her computing device interaction for a significant and/or indefinite span of time. This can be one way of facilitating the Personal Timeline and/or visual history, described above.

Moreover, all this data and/or metadata can be cached locally but held in a cloud computing environment. The data can be encrypted and/or unencrypted. Additionally, the data can be continuously (and/or less frequently) manipulated, analyzed, and/or examined, and can be subsequently put to use to fulfill user intents, as described above. Furthermore, a single system can collect and/or otherwise be associated with data for multiple users. In such case, the system/personal AIs can study the data sets of the multiple users (e.g., which data sets can be stored together in the cloud) so as to efficiently learn/extrapolate abstract task patterns (e.g., learning general patterns regarding sending an email, opening an internet browser, and so on), as described above.

Figure 9A:
FIGS. 9A-9J illustrate a computing device interaction archival and retrieval tool in accordance with one or more embodiments described herein.

FIG. 9A illustrates a mouse pointer selecting a movie button (M) which generates a slide bar shown below with a set of thumbnails associated with video thumbnails that represent portions of video files of user computing device interaction across a range of time. The thumbnails facilitate the user to visually glance through moments in his/her computing device interaction and quickly find a state of interest. Above the set of thumbnails is a scroll bar with a circle slider that allows for the user to scroll across an entire range of time, and as the user is scrolling through different time ranges the thumbnails automatically update to reflect the time range selected by the user. As discussed above, dirty rectangle methods can be implemented to determine a level of impact/importance/relevance of particular changes in display screens (e.g., a change in a displayed clock is not substantively important, whereas a change in a subject line of an email is probably substantively important). Thus, multiple screens and/or video portions/segments containing unimportant changes can be represented by a single thumbnail image, so as to not overwhelm the user with redundant information.

Figure 9B:
Figure 9C:
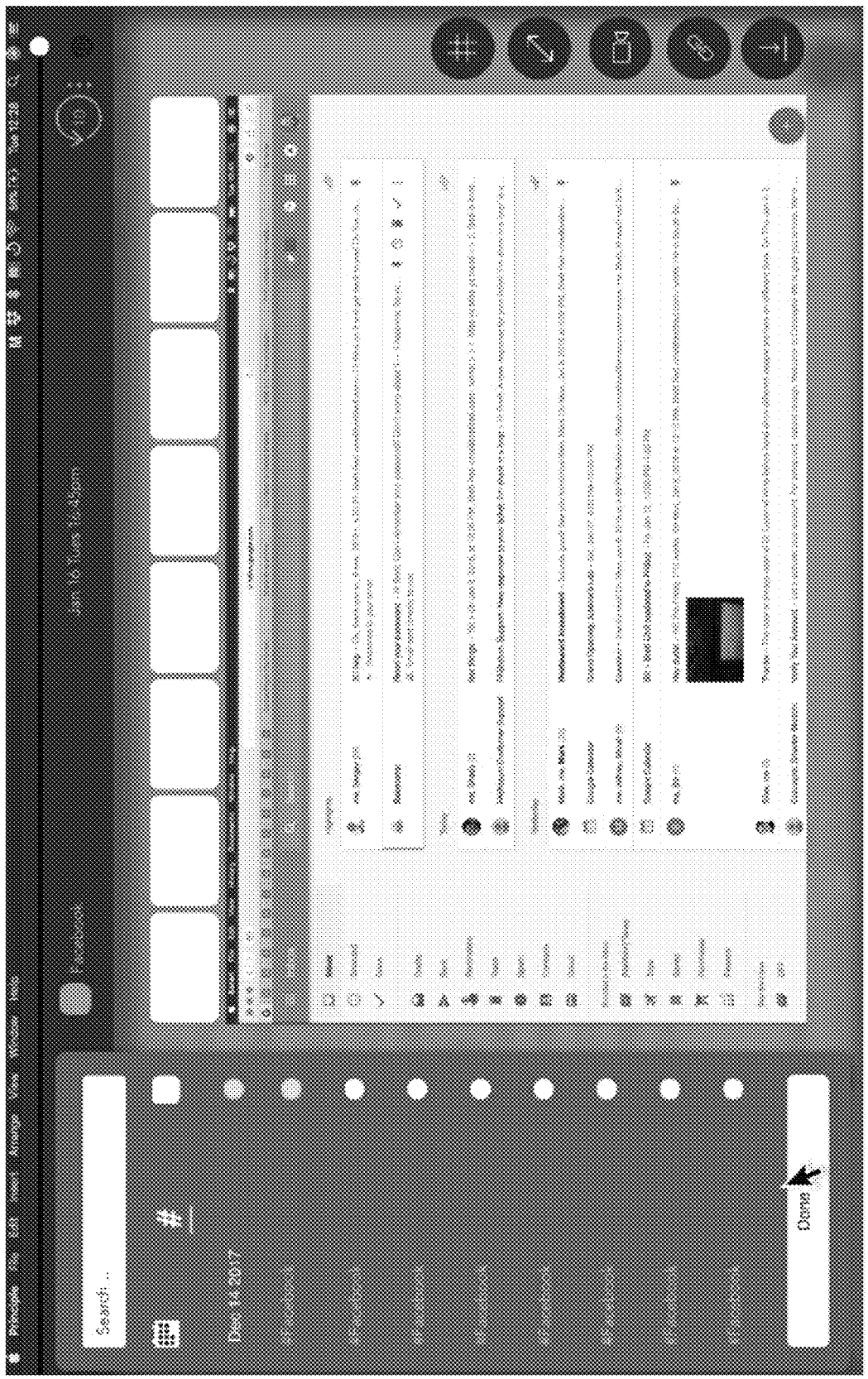
Figure 9D:
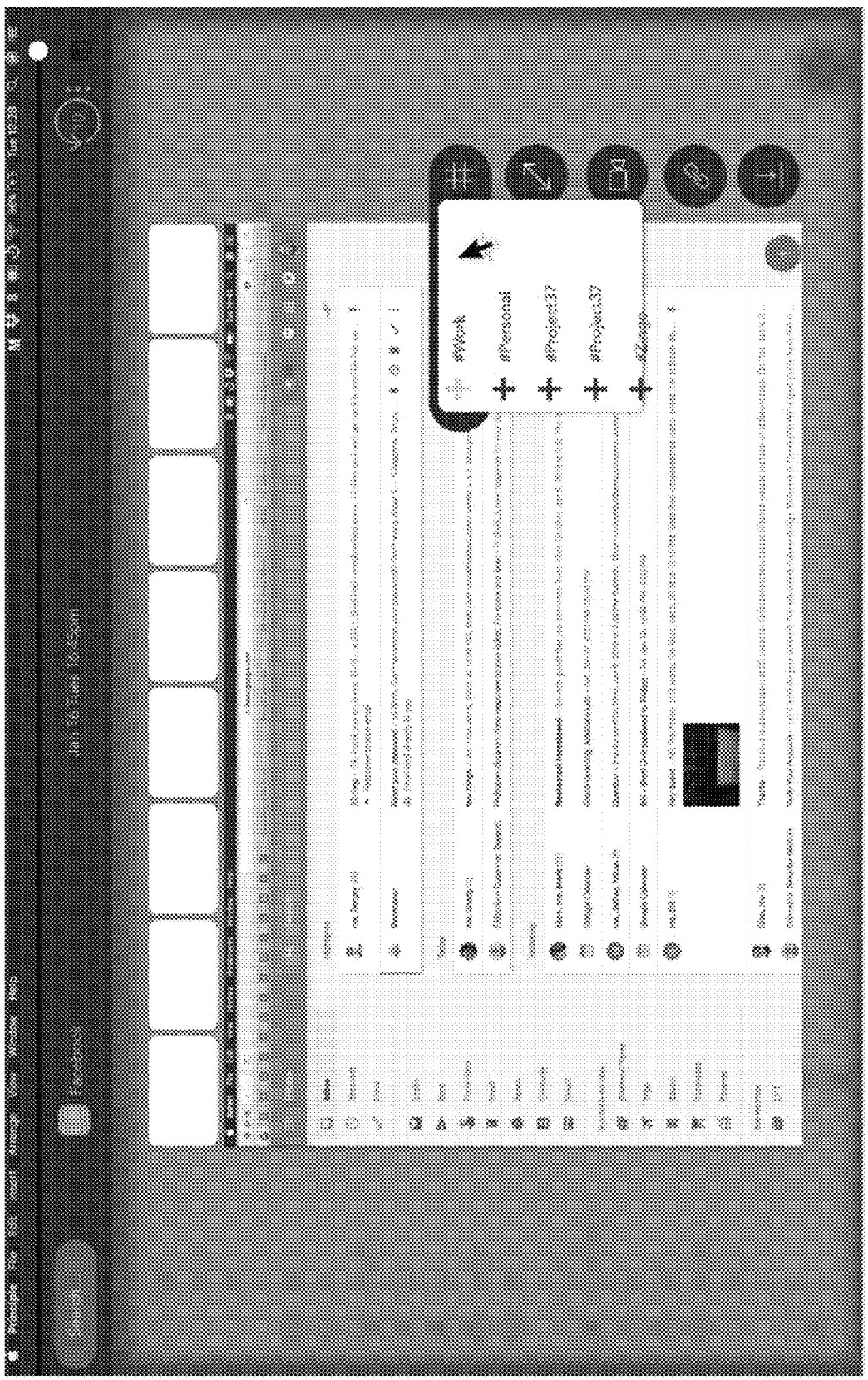

Turning to FIG. 9B, a search tool on the left of the screen (FIG. 9A) can be initiated that opens a calendar where a user can select one or more dates of interest to facilitate converging on a set of video files of potential interest. Additionally, as shown in FIG. 9C, the user can further filter the search by application used (e.g., Facebook, Twitter, Word, PowerPoint, Google Search, and so on) and/or device used (e.g., desktop computer, laptop, smart phone, tablet, and so on). FIG. 9D illustrates further filtering the search using keywords, tags or the like. It is to be appreciated the voice-based commands and/or natural language searching or the like can be employed to converge on computing device interactions of interest. Additionally, extrinsic or contextual information that was collected and stored could also be utilized in the search. For example, the user may have recalled being on his/her cell phone in a park and it was raining that day. The system could utilize GPS tags, weather information, and so on to determine, location, date and time when the user was in that context and then quickly provide the recorded video files of the computing device interaction.

As explained above, this can be performed by using focus objects/sections (e.g., important on-screen markers/changes that are recognizable by the system/personal AI). That is, the search can be multifaceted, including search criteria such as on which device the search was performed, where the search was performed, when the search was performed, what the weather was like when the search was performed, and so on.

Figure 9E:
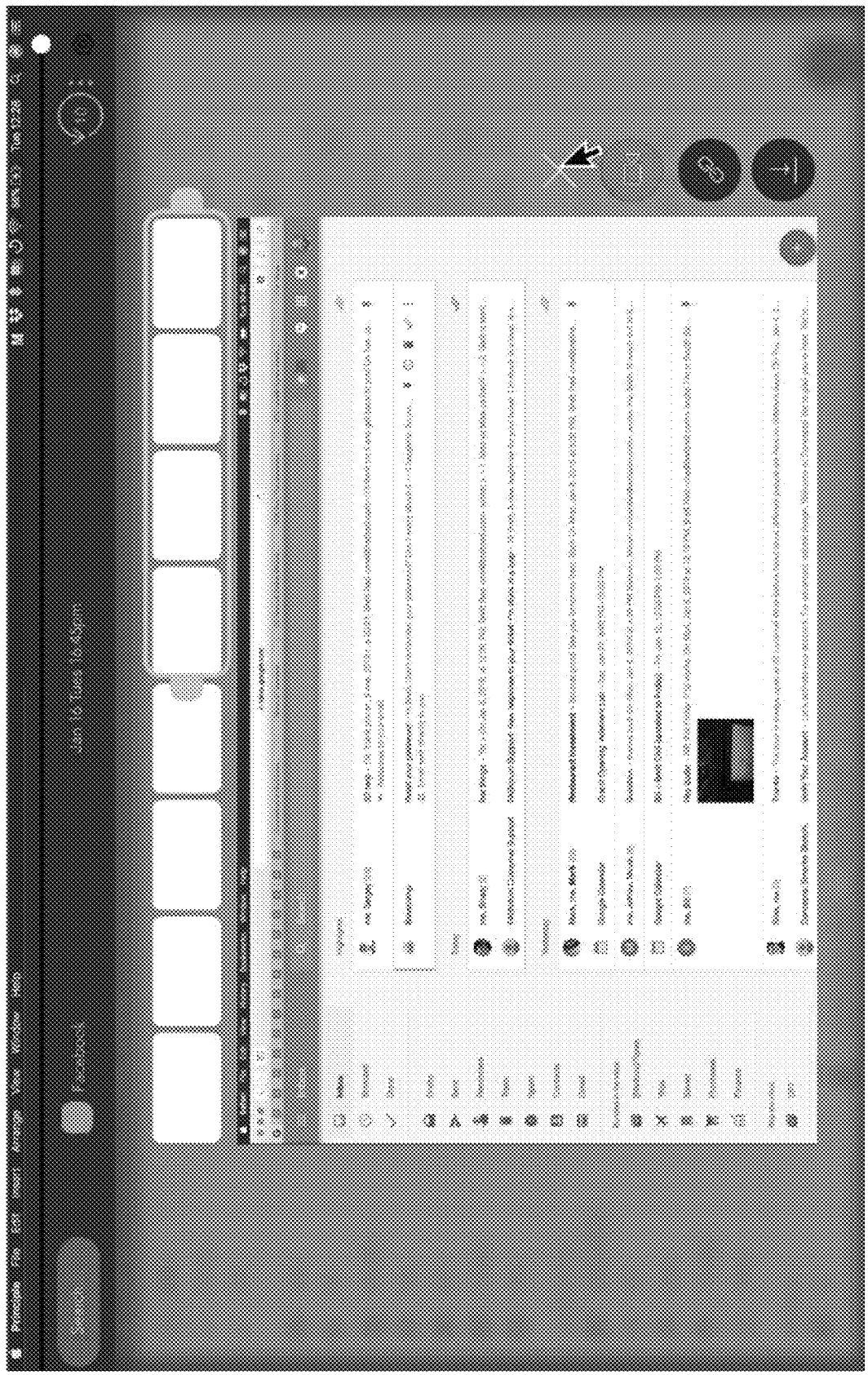
Figure 9F:
Figure 9G:
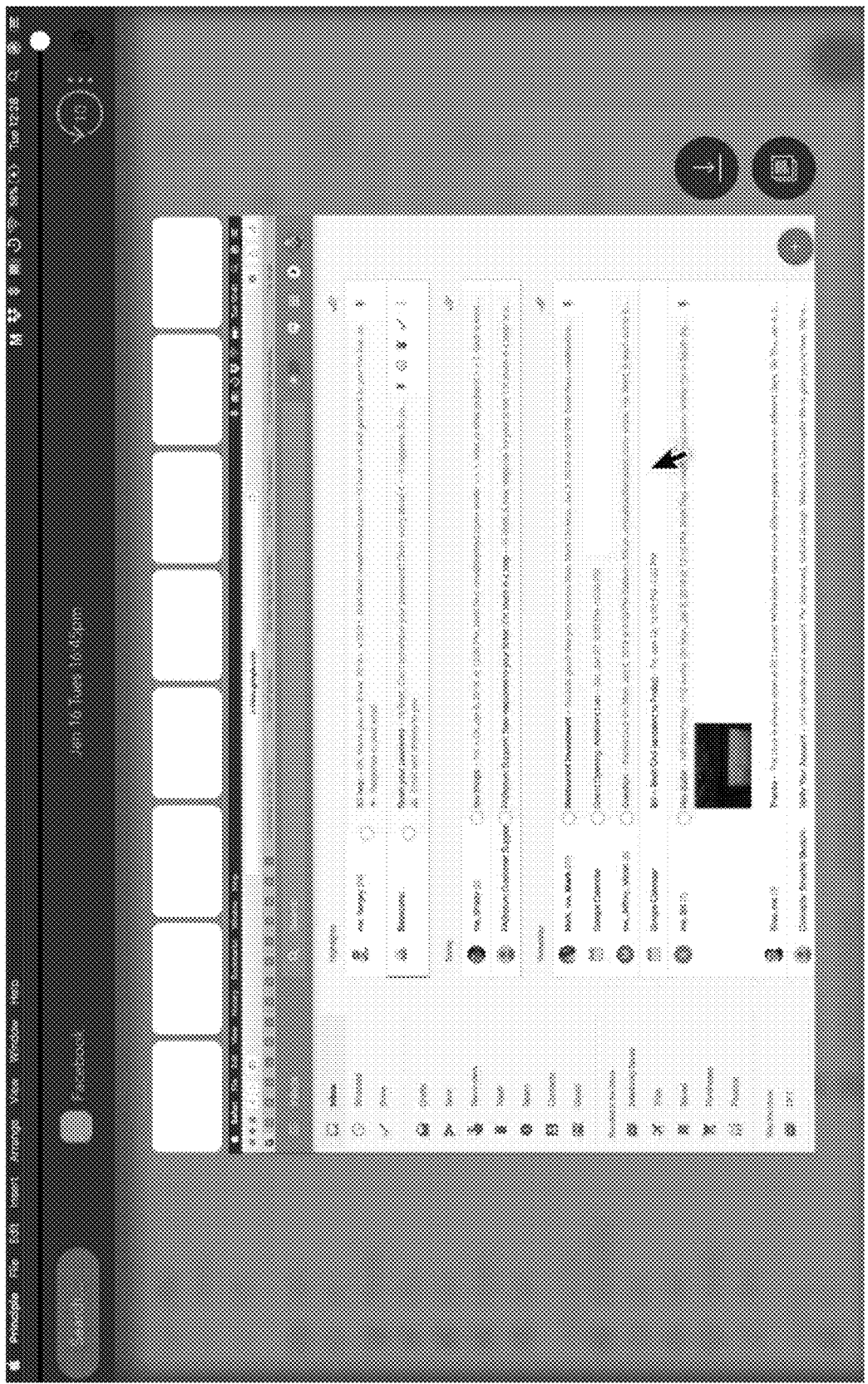
Figure 9H:
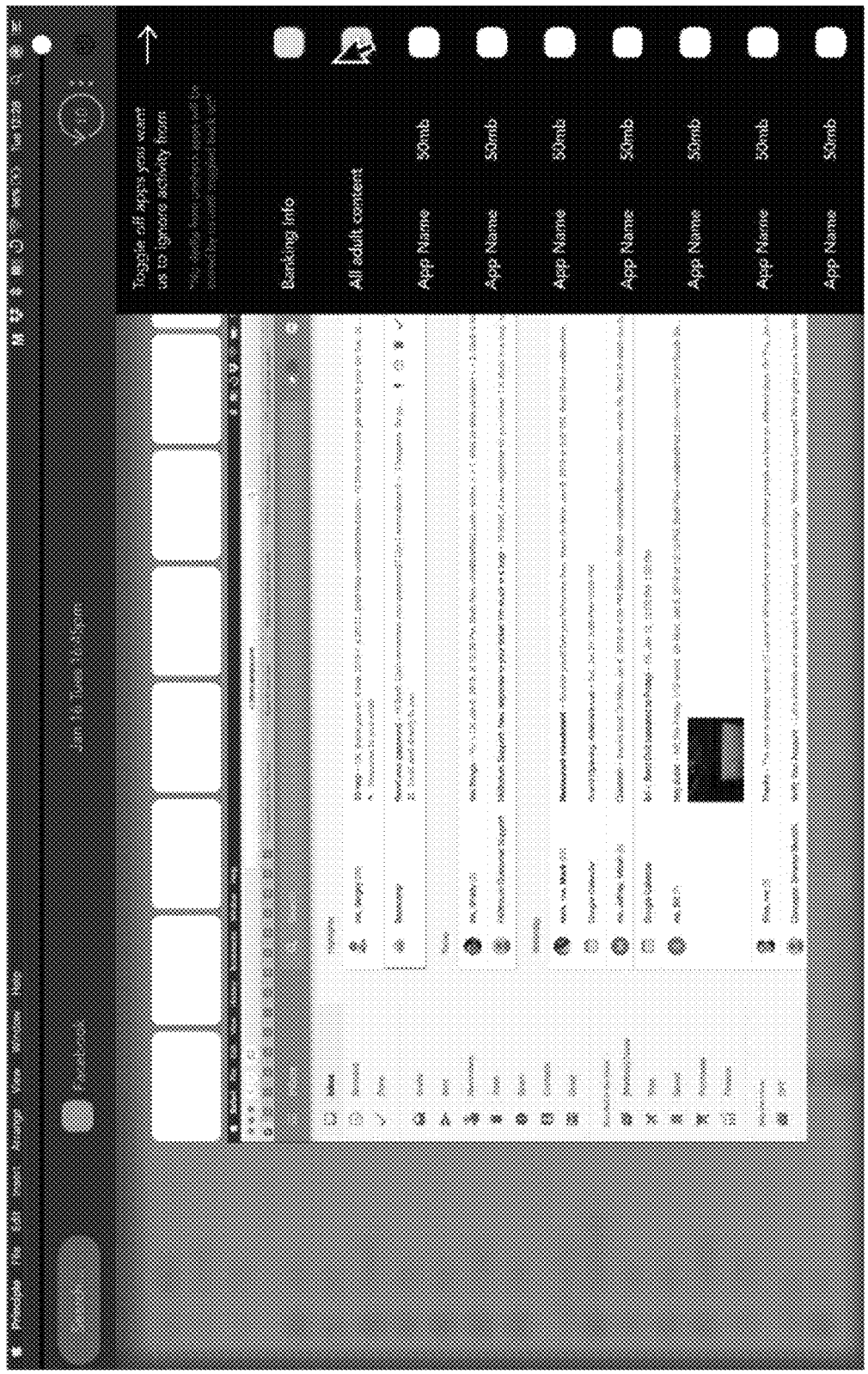
Figure 9I:
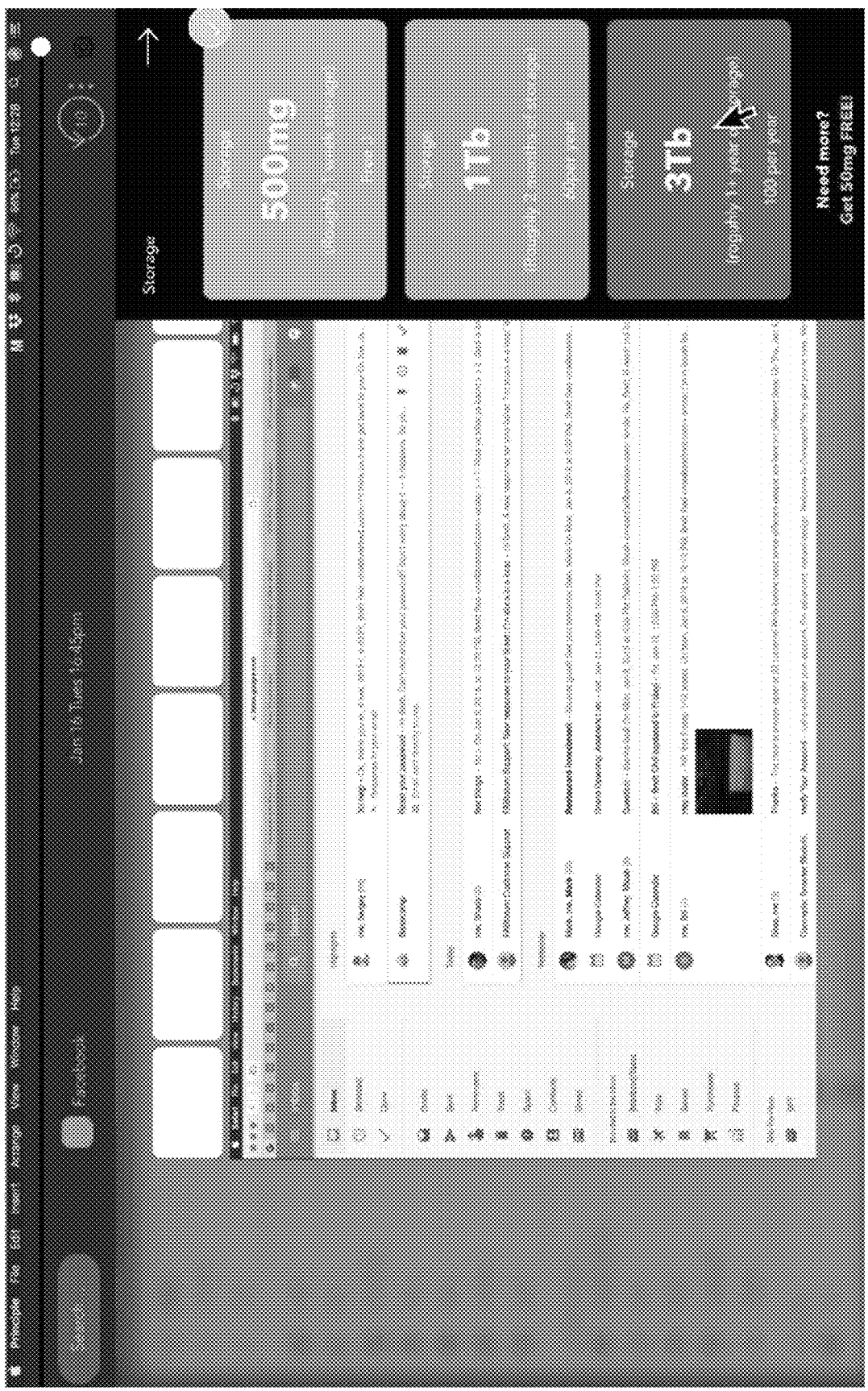
Figure 9J:
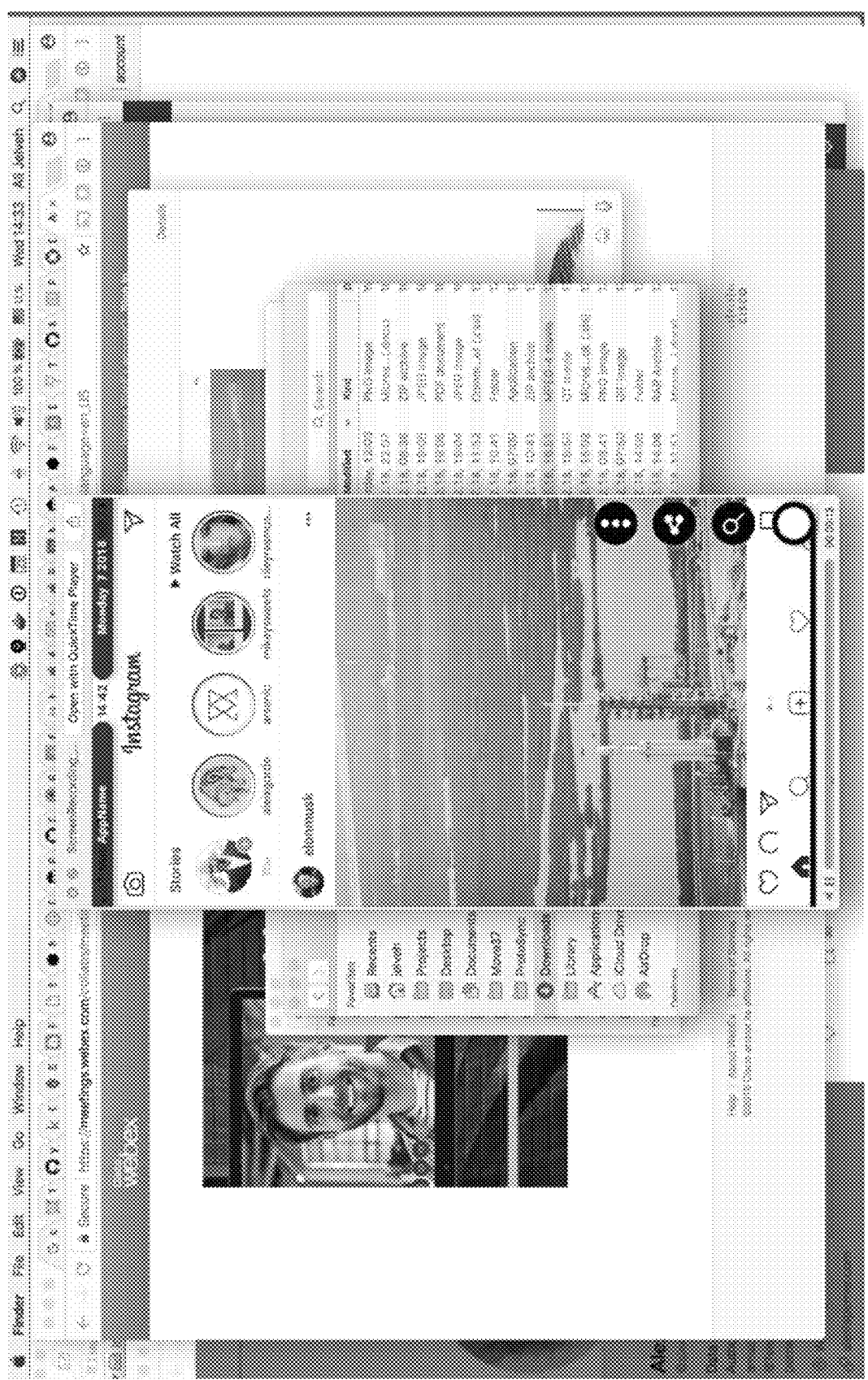

FIG. 9E illustrates a feature where the user can select a particular section of a video file. The user can export, save, transmit or create a private or public link for such section of video as shown in FIG. 9F. As discussed above, various time segments/clusters can be created, where each segment/cluster pertains to a certain substantive goal/action by the user. These clusters/segments can be used to effectively filter through the Personal Timeline/visual history (e.g., only video segments pertaining to a particular substantive goal/task can be shown, thereby not forcing the user to wade through irrelevant time segments/clusters). Another aspect provides for the user to select a portion of the video screen and drag and drop it as shown in FIG. 9G. FIG. 9H illustrates an aspect that provides for selecting application(s) activity to be ignored. FIG. 9I depicts providing the user with various storage options. For example, price of storage can be based on amount of storage space required (e.g., one price for 500 gigabytes) as well as amount of time stored (e.g., one price for 6 months of storage). FIG. 9J depicts an embodiment on a cell phone. Data streams across different devices can be interleaved so that they can be provided with time series computing device interactions as well as knowledge of which device was used and when. Accordingly, user context (e.g., focus of attention, how distracted, frequency of context switching, and so on) can be determined. The video storage is highly dynamic and can record at very granular levels (e.g., every single keystroke); compression techniques can be leveraged to optimize storage utilization. The video files and system can reside in a cloud, on one or more devices, and in a distributed framework for ease of access. Thus, the system allows for a user's entire set of computing device interactions to be stored and easily retrieved and viewed; a multi-layered data stream is generated. User interactions can be stored in a specific track, windows positioning can be stored in a different track, location and/or device can be other tracks or layers that can be stacked, and so on. The analysis component 114 can analyze and learn these layers. In an embodiment, less than 50 GB of storage is simply needed to store an entire year of user computing device interactions. This minimal CPU usage can be leveraged by implementing low-level hardware functions and smart pipe-filling and handling. In an aspect, each and every video frame can be analyzed, indexed and learned to a pixel or text level to provide for a highly extensible and searchable platform for reviewing past computing device interaction.

The system 100 can learn and identify communication events, completion events, entertainment events, and so on. In an embodiment, the system 100 can learn user behavior and identify deficient or undesirable actions and provide feedback to the user to improve efficiency.

In an aspect, audio and transcription of the audio can be added as layered, and such information can be searchable as well.

In an embodiment, employers can leverage such functionality for monitoring employee work performance, determining cause of errors, improving workflow, security, and so on, thereby providing substantially continuous/constant monitoring of employees.

In an embodiment, the analysis component 114 in conjunction with model generation component 108 can learn user behavior and provide recommendations to optimize future computing device interaction.

The subject embodiment provides for a life recorder that can continuously run in the background with low processing load and low storage consumption and store, tag, index computing device interaction in video format, and provide for an elegant tool to quickly retrieve and view past computing device interaction.

Figure 10:
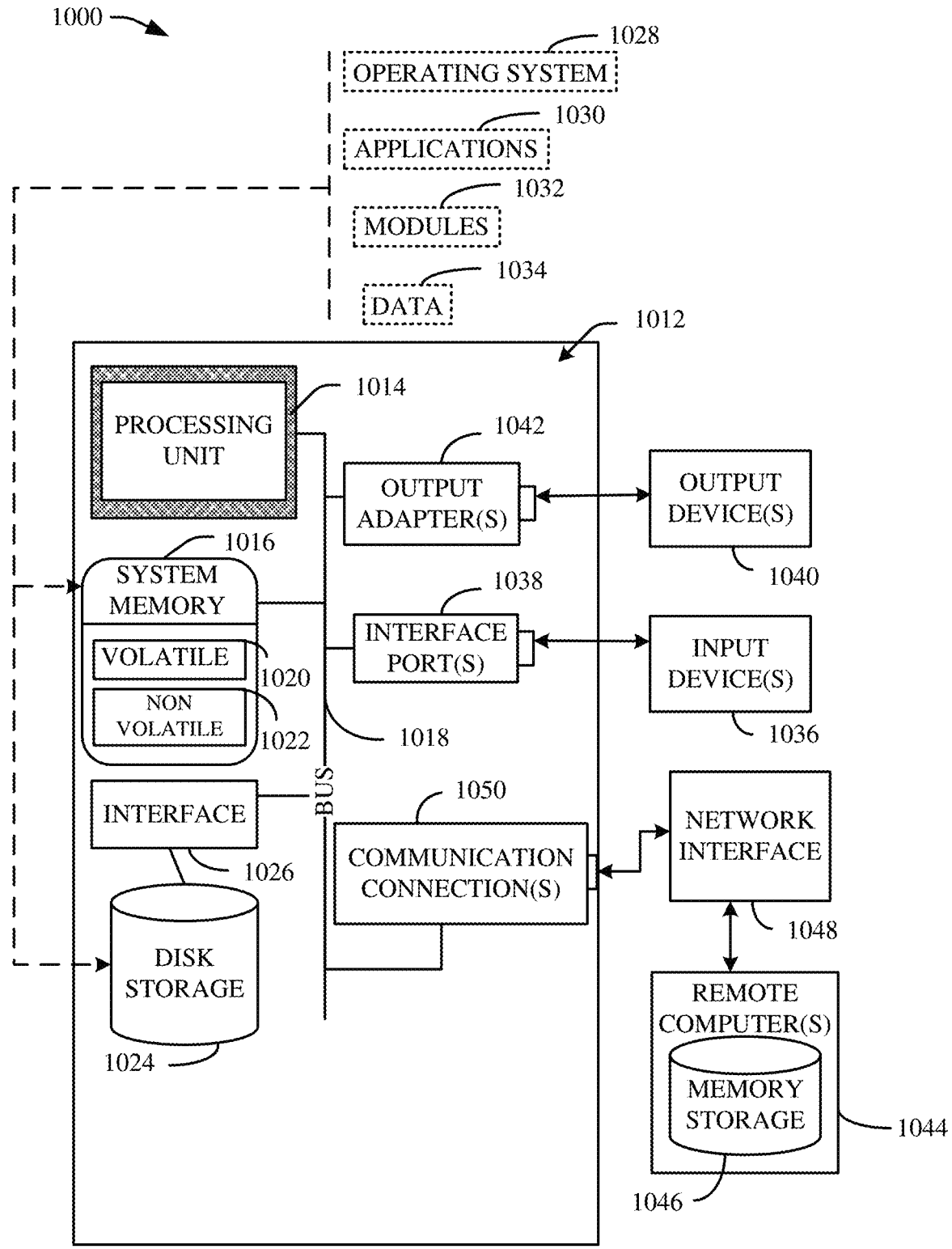
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 13104), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc., that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system to facilitate determining or inferring user intent, comprising:
  a processor that executes computer executable components stored in memory, wherein the computer executable components comprise:
    an input component that receives graphical image data regarding a screen display associated with user interaction with a computing device, the input component comprising a lifegraph, the lifegraph comprising an n-dimensional graph storing people, objects, and relationships connected to a user interacting with the computing device, wherein the input component updating lifegraph data changes over time using time-series data regarding the graphical image data;
    based on the graphical image data, a model generation component that learns user behavior and provides recommendations to optimize future computing device interaction;
    an analysis component that employs a model to determine or infer user intent based on image analysis;
    an action component that provisions services to the user as a function of the determined or the inferred user intent, the action component comprising a personal artificial intelligence assistant accessing lifegraph data to repeat a task pattern; and
  a machine learning model trained on analysis of the graphical image data associated with the screen display to determine or infer the user intent.

2. The system of claim 1, further comprising a gaming component that gamifies interaction with the user in connection with explicitly training the model.

3. The system of claim 1, further comprising wherein a reward component that exposes functionality associated with the trained model as a function of user training efforts.

4. The system of claim 1, further comprising an interactive component that shares status of training of the model with other entities.

5. The system of claim 1, further comprising an avatar component that generates an avatar that interacts with the user based in part on the model and the action component.

6. The system of claim 1, wherein the model employs a recursive learning algorithm or backward propagation of learning across other models or continuous learning algorithm.

7. The system of claim 1, wherein the model learns impact of respective images and directs the action component to revise actions as a function of the learned impact.

8. The system of claim 7, further comprising an optimization component that generates inferences, based on the model, regarding potential points of failure, weakness or bottlenecks in connection with taking automated action.

9. The system of claim 8, comprising a scheduling component that employs the trained model to schedule activities for the user.

10. The system of claim 2, wherein the gaming component displays progress of training of the model.

11. The system of claim 10, wherein the gaming component displays exposed functionalities of the trained model.

12. The system of claim 1, further comprising a training component that generates an interface for explicitly training the model by the user.

13. The system of claim 12, wherein the training component questions the user regarding accuracy of determinations or inferences generated by the model.

14. The system of claim 1, wherein the model identifies two or more applications running concurrently on the screen and determines or infers user intent regarding the respective applications.

15. The system of claim 1, wherein the model analyzes multiple sets of screen image data in a time series manner.

16. A user intent prediction method, comprising:
- executing, by the system operatively coupled to the processor, computer implemented components stored in memory to perform the following acts;
- inferring, by the system operatively coupled to the processor, user intent;
- receiving, by the system operatively coupled to the processor, graphical image data regarding a screen display associated with user interaction with a computing device;
- updating, by the system operatively coupled to the processor, lifegraph data changes over time using time-series data regarding the graphical image data;
- employing, by the system operatively coupled to the processor, a model to determine or infer user intent based on graphical image analysis;
- based on the graphical image data, learning, by the system operatively coupled to the processor, user behavior;
- providing, by the system operatively coupled to the processor, recommendations associated with user intent to optimize future computing device interaction;
- provisioning, by the system operatively coupled to the processor, services to the user as a function of the determined or inferred user intent; and
- accessing, by the system operatively to the processor, lifegraph data to repeat a task pattern.

17. The method of claim 16, further comprising employing a recursive learning algorithm or backward propagation of learning across other models or continuous learning algorithm.

18. The method of claim 16, further comprising using a gaming component to gamify interaction with the user in connection with explicitly training the model.

19. The method of claim 16, further comprising learning impact of respective images and directing an action component to revise actions as a function of the learned impact.

20. A computer readable storage device comprising instructions that, in response to execution, cause a system comprising a processor to perform operations, comprising:
- inferring user intent;
  - receiving graphical image data regarding a screen display associated with user interaction with a computing device;
  - updating lifegraph data changes over time using time-series data regarding the graphical image data;
  - employing a model to determine or infer user intent based on image analysis;
  - based on the graphical image data, learning user behavior;
  - providing recommendations associated with the user intent to optimize future computing device interaction; provisioning services to the user as a function of the determined or the inferred user intent; and
  - accessing lifegraph data to repeat a task pattern.

* * * * *